US010801565B2

(12) United States Patent
Krause et al.

(10) Patent No.: US 10,801,565 B2
(45) Date of Patent: Oct. 13, 2020

(54) DISC BRAKE FOR A UTILITY VEHICLE, AND BRAKE PAD SET

(71) Applicant: KNORR-BREMSE Systeme fuer Nutzfahrzeuge GmbH, Munich (DE)

(72) Inventors: Oliver Krause, Wolfratshausen (DE); Matthias Klingner, Moorenweis (DE); Michael Peschel, Schoengeising (DE); Tobias Schoefberger, Mainburg (DE); Philipp Adamczyk, Stoettwang (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 103 days.

(21) Appl. No.: 15/948,440

(22) Filed: Apr. 9, 2018

(65) Prior Publication Data
US 2018/0223921 A1    Aug. 9, 2018

Related U.S. Application Data

(63) Continuation of application No. PCT/EP2016/074157, filed on Oct. 10, 2016.

(30) Foreign Application Priority Data

Oct. 9, 2015   (DE) .......................... 10 2015 117 285
Mar. 17, 2016  (DE) .......................... 10 2016 104 970

(51) Int. Cl.
F16D 65/14 (2006.01)
F16D 55/226 (2006.01)
(Continued)

(52) U.S. Cl.
CPC ......... *F16D 55/226* (2013.01); *F16D 55/224* (2013.01); *F16D 65/0056* (2013.01);
(Continued)

(58) Field of Classification Search
CPC .... F16D 55/224; F16D 55/227; F16D 65/097; F16D 65/14; F16D 65/24
(Continued)

(56) References Cited

U.S. PATENT DOCUMENTS 3,285,371 A    11/1966   Cadiou
4,471,858 A     9/1984   Kawase
(Continued)

FOREIGN PATENT DOCUMENTS

AU    2016280662 A1    1/2018
CN    85 1 06307 A     2/1987
(Continued)

OTHER PUBLICATIONS

International Search Report (PCT/ISA/210) issued in PCT Application No. PCT/EP2016/074157 dated Jan. 17, 2017 with English translation (seven pages).
(Continued)

*Primary Examiner* — Christopher P Schwartz
(74) *Attorney, Agent, or Firm* — Crowell & Moring LLP

(57) ABSTRACT

A disc brake for a utility vehicle is provided, having a sliding brake caliper which is fastened to a brake carrier and has a central opening above a brake disc. Two brake pads are acted on by at least one restoring device with resilient spreading elements which engage the brake pads and acts equally against the respective tightening direction. The spreading device is arranged in the central opening such that the spreading elements engage directly or indirectly outside the friction linings in the center region of the pad backing plates or at at least two contact regions of the brake pads arranged at a distance from each other with respect to the center. The contact regions each have a contact surface and a bearing
(Continued)

surface, on which the spreading elements are movably arranged. The invention further relates to a corresponding brake pad set.

28 Claims, 31 Drawing Sheets

(51) Int. Cl.
*F16D 65/18* (2006.01)
*F16D 65/00* (2006.01)
*F16D 65/097* (2006.01)
*F16D 55/224* (2006.01)
*F16D 65/092* (2006.01)
*F16D 65/095* (2006.01)
*F16D 55/00* (2006.01)

(52) U.S. Cl.
CPC ......... *F16D 65/092* (2013.01); *F16D 65/095* (2013.01); *F16D 65/097* (2013.01); *F16D 65/0974* (2013.01); *F16D 65/0978* (2013.01); *F16D 65/183* (2013.01); *F16D 2055/0008* (2013.01); *F16D 2055/0029* (2013.01)

(58) Field of Classification Search
USPC .................................. 188/72.3, 73.36–73.38
See application file for complete search history.

(56) References Cited

U.S. PATENT DOCUMENTS

| | | | |
|---|---|---|---|
| 4,491,204 A * | 1/1985 | Dirauf | F16D 65/097 116/208 |
| 4,775,033 A | 10/1988 | Heibel | |
| 5,538,103 A * | 7/1996 | Rueckert | F16D 55/227 188/1.11 L |
| 5,549,181 A * | 8/1996 | Evans | F16D 65/097 188/216 |
| 5,875,873 A * | 3/1999 | Kay | F16D 55/224 188/73.37 |
| 6,971,486 B2 * | 12/2005 | Stickney | F16D 55/224 188/73.35 |
| 8,037,977 B2 * | 10/2011 | Arakawa | F16D 65/0977 188/250 E |
| 8,544,614 B1 | 10/2013 | Plantan et al. | |
| 8,944,221 B2 | 2/2015 | Pericevic et al. | |
| 9,097,304 B2 | 8/2015 | Plantan et al. | |
| 9,261,152 B2 * | 2/2016 | Gutelius | F16D 65/0973 |
| 9,382,957 B2 | 7/2016 | Asen et al. | |
| 10,100,887 B2 * | 10/2018 | Graaf | F16D 55/226 |
| 2012/0085597 A1 | 4/2012 | Narayanan | |
| 2012/0186917 A1* | 7/2012 | Gutelius | F16D 65/0972 188/72.3 |
| 2012/0222925 A1 | 9/2012 | Kaneko | |
| 2013/0256068 A1 | 10/2013 | Hazeki et al. | |
| 2014/0131148 A1 | 5/2014 | Plantan et al. | |
| 2014/0339026 A1 | 11/2014 | Gutelius et al. | |

FOREIGN PATENT DOCUMENTS

| | | |
|---|---|---|
| CN | 1098482 A | 2/1995 |
| CN | 1133082 A | 10/1996 |
| CN | 1440495 A | 9/2003 |
| CN | 1664396 A | 9/2005 |
| CN | 1737398 A | 2/2006 |
| CN | 1749592 A | 3/2006 |
| CN | 1865727 A | 11/2006 |
| CN | 101498346 A | 8/2009 |
| CN | 101571169 A | 11/2009 |
| CN | 101932846 A | 12/2010 |
| CN | 102027257 A | 4/2011 |
| CN | 102105720 A | 6/2011 |
| CN | 203023344 U | 6/2013 |
| CN | 103527681 A | 1/2014 |
| CN | 203604502 U | 5/2014 |
| CN | 104254705 A | 12/2014 |
| CN | 104507770 A | 4/2015 |
| CN | 104508315 A | 4/2015 |
| CN | 104583630 A | 4/2015 |
| DE | 2255678 A1 | 5/1974 |
| DE | 29 31 071 A1 | 3/1981 |
| DE | 43 01 621 A1 | 8/1993 |
| DE | 196 26 302 A1 | 1/1998 |
| DE | 19650425 A1 | 6/1998 |
| DE | 19857074 A1 | 6/2000 |
| DE | 10358086 A1 | 7/2005 |
| DE | 10 2007 001 213 A1 | 7/2008 |
| DE | 10 2009 009 567 A1 | 9/2009 |
| DE | 10 2008 019 265 A1 | 10/2009 |
| DE | 102010023143 A | 12/2011 |
| DE | 10 2012 006 111 A1 | 9/2013 |
| DE | 102013110159 A2 | 3/2014 |
| DE | 102013101781 A1 | 5/2014 |
| DE | 102013013687 A1 | 2/2015 |
| DE | 102013016312 A1 | 4/2015 |
| EP | 2767726 A1 | 8/2014 |
| EP | 2570689 B1 | 8/2015 |
| GB | 2 107 808 A | 5/1983 |
| JP | 46-42252 B | 12/1971 |
| JP | S 53127972 A | 11/1978 |
| JP | 57-179435 A | 11/1982 |
| JP | 58-61934 U | 4/1983 |
| JP | 7-38771 U | 7/1995 |
| JP | 2010-270799 A | 12/2010 |
| JP | 2010270799 A | 12/2010 |
| JP | 2013-204742 A | 10/2013 |
| JP | 2014-167323 A | 9/2014 |
| RU | 1831609 A3 | 7/1993 |
| RU | 2087769 C1 | 8/1997 |
| SE | 342298 B | 1/1972 |
| SU | 1254223 A1 | 8/1986 |
| WO | WO 96/08663 A1 | 3/1996 |
| WO | WO 2008079086 A1 | 7/2008 |
| WO | WO 2009/100626 A1 | 8/2009 |
| WO | WO 2015022080 | 2/2015 |
| WO | WO 2016/202778 A1 | 12/2016 |

OTHER PUBLICATIONS

German-language Written Opinion (PCT/ISA/237) issued in PCT Application No. PCT/EP2016/074157 dated Jan. 17, 2017 (seven pages).
Chinese-language Office Action issued in counterpart Chinese Application No. 201680067841.1 dated Mar. 1, 2019 with English translation (14 pages).
Russian-language Office Action issued in counterpart Russian Application No. 2018115522/11(024158) dated Feb. 4, 2019 with English translation (15 pages).
Japanese-language Office Action issued in counterpart Japanese Application No. 2018-516000 dated Jul. 3, 2019 with English translation (16 pages).
International Preliminary Report on Patentability (PCT/IB/326 & PCT/IB/373) issued in PCT Application No. PCT/EP2016/074157 dated Apr. 19, 2018, including English translation of document C2 (German-language Written Opinion (PCT/ISA/237) previously filed on Apr. 9, 2018) (seven (7) pages).
Hindi-language Office Action issued in Indian Application No. 201837012551 dated Jan. 31, 2020 with English translation (five (5) pages).
Australian Office Action issued in Australian Application No. 2016335294 dated Jun. 15, 2020 (six pages).
Brazilian Office Action issued in Application No. BR112018007044-0, dated Jul. 30, 2020, with English translation (six pages).

* cited by examiner

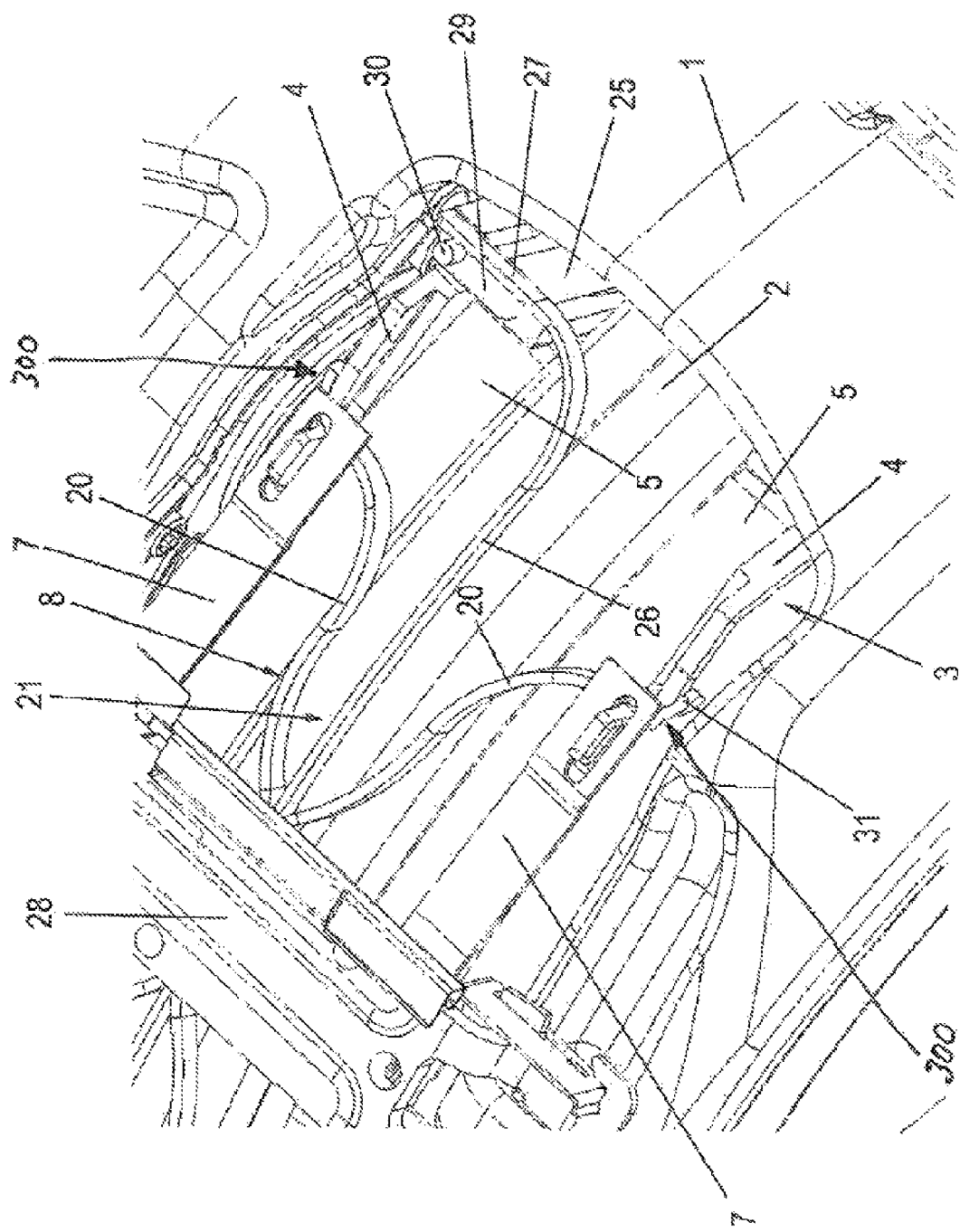

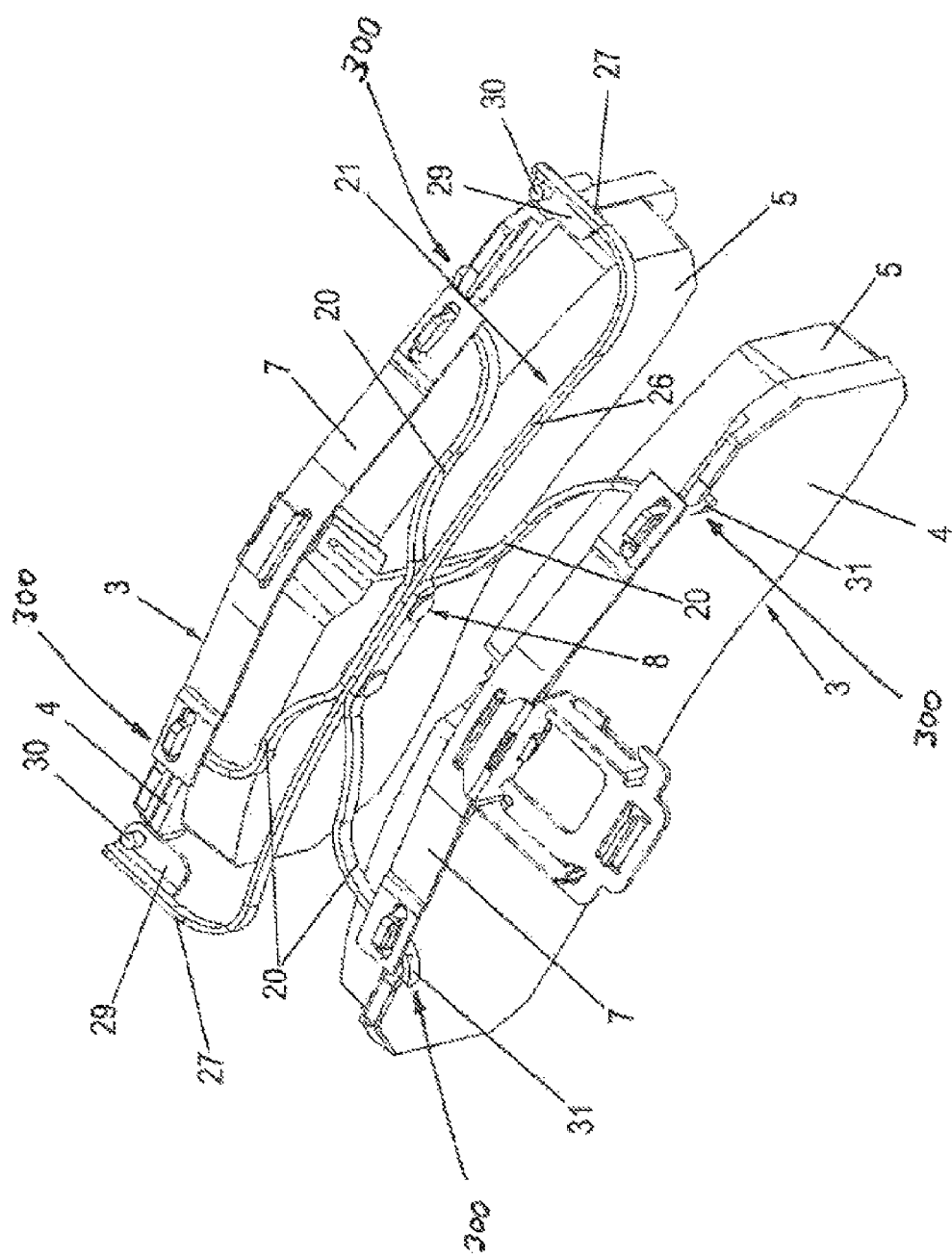

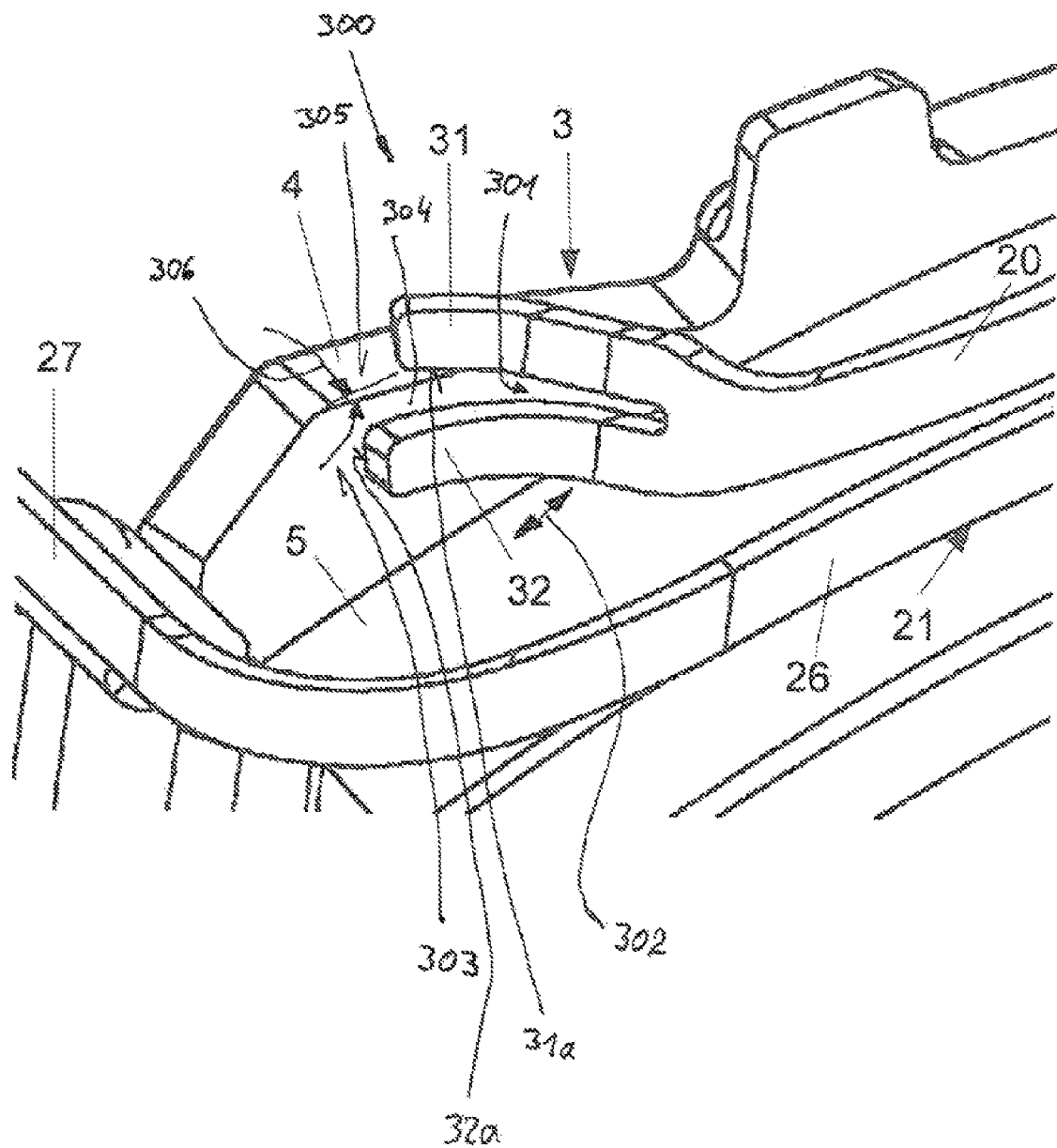

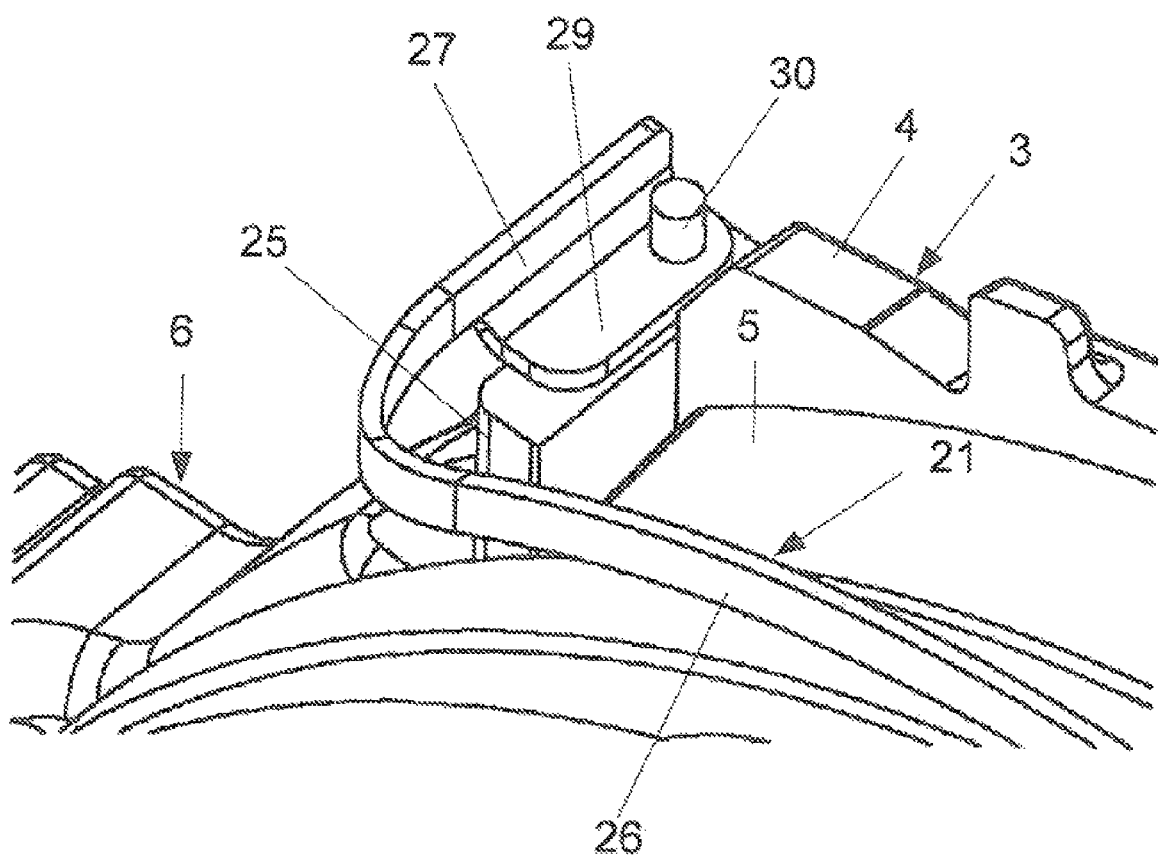

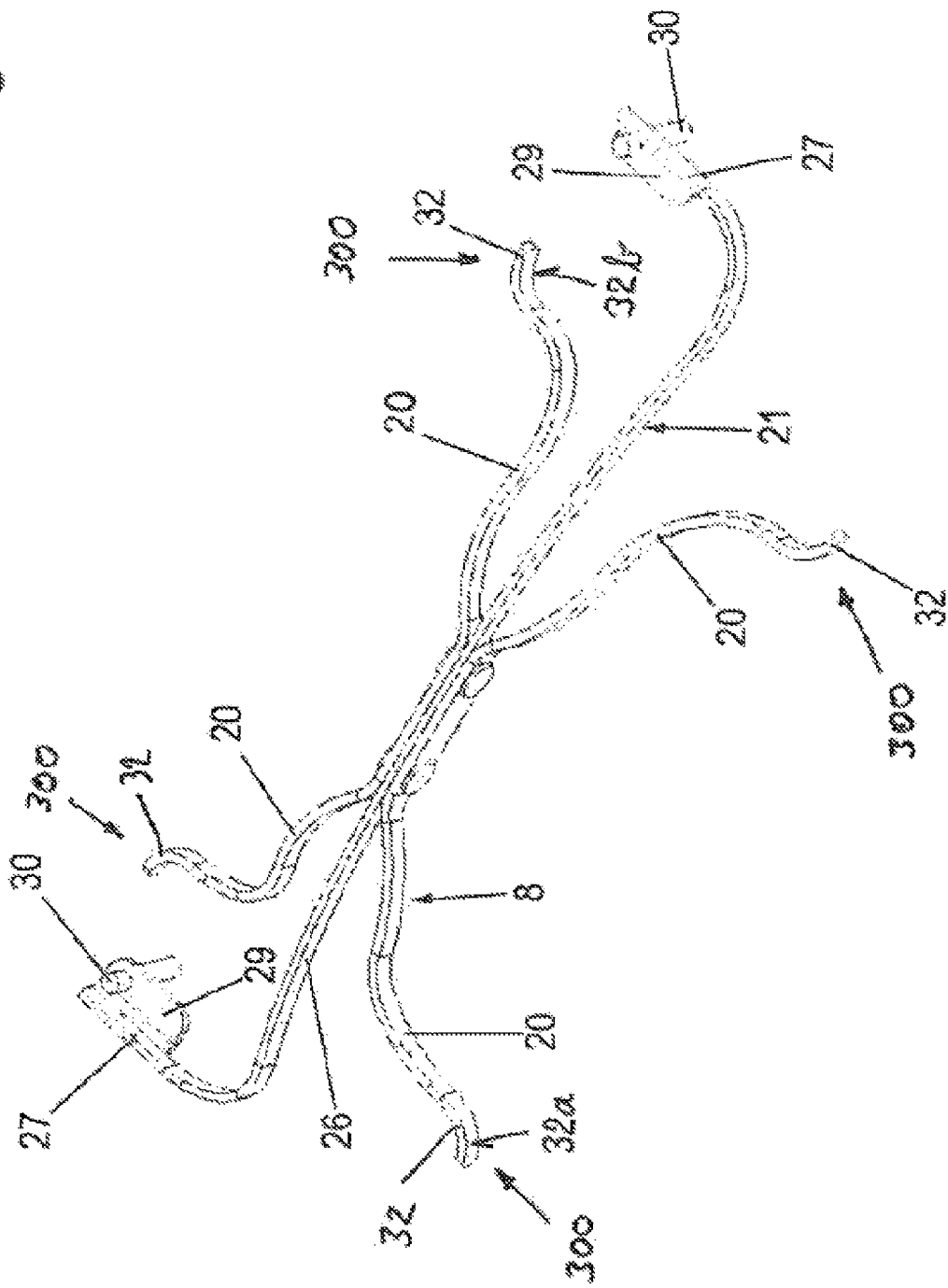

DISC BRAKE FOR A UTILITY VEHICLE, AND BRAKE PAD SET

CROSS REFERENCE TO RELATED APPLICATIONS

This application is a continuation of PCT International Application No. PCT/EP2016/074157, filed Oct. 10, 2016, which claims priority under 35 U.S.C. § 119 from German Patent Applications Nos. 10 2015 117 285.2, filed Oct. 9, 2015, and 10 2016 104 970.0, filed Mar. 17, 2016, the entire disclosures of which are herein expressly incorporated by reference.

BACKGROUND AND SUMMARY OF THE INVENTION

The invention relates to a disc brake for a utility vehicle. The invention also relates to a brake pad set.

In the case of a generic disc brake, also known as a sliding-caliper brake, in a braking situation, an action-side brake pad is pressed against a vehicle-side brake disc by way of an application device, which is actuable pneumatically or by electric motor. During the further course of the braking process, the brake caliper is, relative to the brake disc, displaced counter to the application direction of the action-side brake pad, causing the opposite, reaction-side brake pad to be driven along and pressed against the other side of the brake disc.

In the case of the known disc brake, after a release of the brake, the brake caliper remains in said position, in which the brake pads, or at least the reaction-side brake pad, lies against the brake disc duly without pressure but with a rubbing action. The residual rubbing torques of the brake pads that thereby arise during driving operation have a disadvantageous effect because they lead to increased fuel consumption and to a reduction of the service life of the components involved, specifically of the brake disc and of the brake pads.

It is duly the case that the brake pads are released slightly during driving operation for example as a result of a wobbling movement of the brake disc and as a result of vibrations and lateral accelerations during cornering. These effects are however not sufficient to prevent said residual rubbing torques in an effective manner.

To counteract this problem, the generic DE 10 2007 001 213 discloses a disc brake having a resetting device which is arranged in one of the guide beams by way of which the brake caliper is displaceably held on the brake carrier, which resetting device has a resilient resetting element by which the brake caliper is displaced into an initial position.

This construction has proven successful in principle. However, the use of said known resetting device can lead to problems in the case of compressed-air-actuated disc brakes of heavy utility vehicles, because here, there are wide-ranging influences resulting from component tolerances and component deformations, which have the effect that reliable functioning of said resetting device is not permitted in all situations.

Similar problems arise in the case of a disc brake such as that to which DE 10 2012 006 111 A1 relates. Here, a resetting device is arranged on the side which is situated opposite the application device and which faces toward the reaction-side brake pad, whereby effective, in particular automatic resetting of the brake caliper is realized, with a simultaneously minimal effect on the system rigidity.

In any case, the resetting device acts on the brake caliper, wherein the brake carrier functions as a counterbearing.

DE 43 01 621 A1 describes a floating-caliper disc brake having a positionally static brake carrier which has two carrier arms which project over the outer edge of a disc brake, having brake shoes which are arranged on both sides of the brake disc and which have in each case one friction pad and one rear plate and which are supported displaceably on the carrier arms, having a floating caliper which is guided axially displaceably on the brake carrier and which engages around the brake shoes and has an actuating device designed for pressing the brake shoes against the brake disc, having a spring arrangement which acts axially on the brake shoes in a brake release direction and which, after the braking operation, assists in the setting of an air gap between the brake shoes and the brake disc. The spring arrangement has at least one spreading spring which is fastened in non-displaceable fashion in an axial direction to a carrier arm of the brake carrier, in that the fastening is performed to a section of the carrier arm situated over the outer edge of the brake disc, and in that the spreading spring has at least two spring arms which lie resiliently in an axial direction against the rear plates of the brake shoes.

US2014/0339026 A1 describes a spreading spring comprising a locking arm which connects the spreading spring to a brake component, a retraction arm; and a preload device which is arranged between the locking arm and the retraction arm, wherein the preload device comprises six or more spiral-shaped loops which store energy during a braking activation and which retracts the brake components (brake pad) as soon as the braking process has ended.

The invention is based on the object of further developing a disc brake of the generic type such that, with the simplest structural means, the service life in particular of the brake pads and of the brake disc is lengthened, and the operating costs are altogether lowered.

A further object consists in providing a corresponding brake pad set.

A disc brake according to the invention for a utility vehicle, having a brake caliper which engages over a brake disc and which is in the form of a sliding caliper and which is fastened to a positionally static brake carrier and which has a central opening over the brake disc, includes two brake pads which are arranged in the brake caliper and which are movable in opposite directions and which have in each case one pad carrier plate and one friction pad fastened thereto and of which an action-side brake pad can be pressed against the brake disc by way of an application device via at least one brake plunger. The disc brake further includes at least one resetting device by which the brake caliper can be reset after a braking-induced displacement and release of the brake, wherein the resetting device has a spreading device which engages on the opposite brake pads and which acts equally counter to the respective application direction and which has resilient spreading elements which engage on the respective pad carrier plate. The spreading device is arranged in the central opening, wherein the spreading elements engage, outside the friction pads, directly or indirectly on one side in the center region, or at at least two abutment regions arranged spaced apart from one another relative to the center, of the brake pads, wherein the abutment regions have in each case one abutment surface and one bearing surface on which the spreading elements are movably arranged.

With the design of the disc brake according to the invention, synchronous resetting of both brake pads and resetting of the brake caliper when the brake is released are realized, wherein the synchronicity relates both to the resetting forces and to the resetting travels. Here, the resetting force acts counter to the respective application direction of the two brake pads, that is to say, in the case of the reaction-side brake pad, toward the caliper rear section, and in the case of the action-side brake pad, toward the caliper head, with gaps with respect to the brake disc being formed.

The spreading device expediently engages on the two brake pads at the pad carrier plates, specifically on the side facing toward the friction pad fastened thereto or on the opposite rear side. To prevent jamming of the respective brake pad during the resetting movement, the spreading element engages either centrally on an upper exposed edge region of the pad carrier plate or symmetrically on two abutment regions to the right and to the left.

A brake pad set according to the invention for the disc brake according to the invention has at least two brake pads with in each case one pad carrier plate and with a friction pad attached to the pad carrier plate, and has the spreading device as indicated above. The pad carrier plates have, outside the friction pads and on one side in the center region or at at least two abutment regions arranged spaced apart from one another relative to the center, in each case one abutment surface and one bearing surface. This yields the advantage that multiple functions (axial and radial transmission of spring force, spring end guidance) are realized in a small space.

In one embodiment, the spreading elements extend, proceeding from a central region in the center of the opening, from the inside to the outside to the abutment regions which are arranged spaced apart from one another relative to the center. It is also possible for the spreading elements to extend, proceeding from a central region in the center of the opening, from the inside to the outside to the abutment regions which are arranged spaced apart from one another uniformly relative to the center.

In this way, the spreading device is arranged in the center in the brake caliper, wherein said spreading device is likewise arranged within an envelope of a wheel rim of an associated wheel.

The two spreading elements are connected to one another in the center (in relation to the carrier horns). It is thus possible to ensure a spring force which is identical—in a small tolerance range—both on the run-in side and on the run-out side.

Different spring forces between run-out side and run-in side, which can lead to oblique wear, are minimized by way of the unilateral engagement of in each case one spring per pad.

A further embodiment provides that the central region of the opening extends to both sides of a virtual center of the opening approximately parallel to the plane of the brake disc over a length in a range from 30 to 50% of a longitudinal axis of the opening. This yields an advantageous adaptation of the spring forces.

In another embodiment, the spreading device has spring arms, of which in each case two lie against an associated pad carrier plate, wherein the spring arms are connected to one another in the central region of the opening, which simplifies installation during assembly and maintenance work.

According to a further concept of the invention, the spreading device has oppositely acting spreading elements, preferably with elastic action, in particular in the form of spring elements.

In the simplest form, a compression spring in the form of a helical spring or leg spring is arranged between the two brake pads, wherein the leg spring is mounted in the center above the brake disc, for example on a pad retaining stirrup by means of which the two brake pads can be pushed under preload into a pad slot. In principle, with the use of a helical spring, the attachment of the ends thereof to the pad carrier plates is sufficient to realize the spreading function to an adequate extent.

According to a further concept of the invention, the spreading device is operatively connected not to the pad retaining stirrup but to the brake carrier, which forms a counterbearing and in which the brake pads are mounted so as to be displaceable coaxially with respect to the brake disc.

For this purpose, a retaining bow is provided which extends over the brake disc in the circumferential region as far as brake carrier horns which delimit a pad slot on both sides, which retaining bow is, in relation to the thickness of the brake disc, arranged in the center relative to said brake disc.

In one embodiment, the retaining bow may be attached to two mutually oppositely situated stirrups which are connected to the brake carrier, which permits simple attachment.

Alternatively, the retaining bow may be connected to at least the two brake carrier horns of a pad slot, whereas the spreading elements, which engage on the two brake pads, are connected to the retaining bow. Said retaining bow thus forms a centring device which, in correspondence with the brake carrier as a fixed bearing, may also be realized in some other way in terms of construction.

The retaining bow is preferably of C-shaped form in terms of its contour, with a center limb which extends over the brake disc to the extent mentioned and with two end limbs which are angled in the same direction as said center limb toward the brake carrier horns and of which in each case one is fastened to a brake carrier horn of the corresponding pad slot.

By way of the retaining bow to which the spreading device is fastened by way of its spring arms, automatic centring of the brake caliper after a release of the brake, that is to say after the ending of a braking process, is realized, wherein, by way of the thus fixed positioning of the spreading device, the brake pads are reset such that the brake caliper is centerd relative to the brake disc.

Furthermore, the spreading device is designed so as to act over the entire range of wear of the brake pads.

Since the points of force engagement on the brake pads change with progressive wear, those functional parts of the spreading device which make contact with the brake pads are designed so as to be supported in sliding fashion on the pad carrier plate of the respective brake pads.

To ensure secure retention of the spring limbs, or, in the case of a different design variant, of the spring arms, even under the action of vibrations during driving operation, the spring arms are supported on the upper edge of the pad carrier plate in relation to the base of the pad slot, likewise in sliding fashion as described above.

With corresponding design of the spreading device, it is moreover possible to dispense with the use of pad retaining springs, which, as is known from the prior art, are fastened to the upper edge of the pad carrier plates and on which a pad retaining stirrup is supported, such that the respective brake pad is retained under preload in the pad slot of the brake carrier.

The structural realization of the spreading device according to the invention may differ in terms of construction, wherein a major advantage emerges from the fact that it is possible to substantially dispense with moving components, self-evidently with the exception of the resilient spreading elements which, for their function, perform a resilient deflection.

The omission of moving parts that is now possible self-evidently has the effect of lengthening the service life of the spreading device, as does the low number of components required, resulting, moreover, in extremely inexpensive production and assembly.

In a further embodiment, each spring arm is formed, at the end, with a fork-shaped spring end such that a support limb and a pressure-exerting limb are formed, wherein the support limb lies movably on a bearing surface of a narrow side of the pad carrier plate, and the pressure-exerting limb lies movably with pressure against an abutment surface of that side of the pad carrier plate which faces toward the friction pad. In this way, an advantageous simultaneous functionality is possible, specifically in that the spring arm can not only introduce pressure forces via the abutment surface into the pad carrier plate but is also guided displaceably in terms of its movements by the abutment surface and the bearing surface. It is furthermore possible for the brake pad to be retained resiliently in its brake pad slot by way of the spring force that is introduced into said brake pad via the bearing surface.

In one embodiment, the bearing surface may be arranged at an angle with respect to a horizontal, wherein the angle lies in a range from 3 to 15°.

In another embodiment, the abutment surface may protrude from the pad carrier plate or be formed into the pad carrier plate. An advantageous adaptation to different brake designs is thus possible.

Furthermore, a projection may be provided on the abutment surface, wherein the projection protrudes from the abutment surface into a slot between the support limb and the pressure-exerting limb. This can permit precise guidance and improved transmission of force.

In an alternative embodiment, each spring arm is formed, at the end, with a spring end with a pressure-exerting limb, wherein the pressure-exerting limb is in contact with a support section of that side of the pad carrier plate which faces toward the friction pad, wherein the pressure-exerting limb, by way of an abutment section, lies movably with pressure against an abutment surface of the support section of the pad carrier plate, and at the same time, by way of a bearing section, lies movably on a bearing surface of the support section of the pad carrier plate. This yields the advantage that two functions can be realized in the pressure-exerting limb, specifically transmission of spring force in an axial and in a radial direction to the brake pad, with simultaneous guidance of the spring end and a saving of structural space and material.

In one embodiment, it is preferable for the support section with the abutment surface and the bearing surface to be formed into the pad carrier plate. This is advantageous because it results in a saving of space and material.

The bearing surface of the abutment regions may be arranged at an angle with respect to a horizontal, wherein the angle lies in a range from 3 to 15°. Guidance of the spring end is improved in this way.

If the abutment surface protrudes from the pad carrier plate or is formed into the pad carrier plate, it is thereby possible to realize an advantageous adaptation to different installation situations.

It is also possible for a projection to be provided on the abutment surface, wherein the projection protrudes from the abutment surface. More precise guidance of the spring end is thus possible.

A particularly advantageous embodiment can be made possible if the abutment regions have a support section which, with the abutment surface and the bearing surface, is formed into the pad carrier plate. This yields a saving of space and material.

In a particularly preferred embodiment, it is provided that the abutment surface runs so as to be offset, in a direction pointing away from the friction pad, relative to that side surface of the pad carrier plate which is equipped with the friction pad. This yields advantageous guidance of the spring end in the pad carrier plate together with a transmission of spring force in a small installation space.

The spreading device comprises two spreading elements, wherein a first spreading element acts on a first pad and a second spreading element acts on a second pad. The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, are minimized by way of the unilateral engagement of in each case one spring per pad.

A uniform application of force by the springs on the action side and on the reaction side, or on the thrust-piece side and on the caliper side, can be realized by way of a flexible adjustment of the center web. Furthermore, it is possible for slight incorrect geometrical positioning of disc, pad and carrier to be compensated by way of the flexible center web.

By way of the center web, it is possible for the active resetting device to be easily positioned and held down by the pad retaining stirrup. It is advantageously possible, during a pad change, for the resetting device to be easily removed and also exchanged.

Through the utilization of the entire pad slot between the carrier horns, it is possible for use to be made of spreading elements or springs with a relatively low spring rate in order to impart relatively constant forces in the event of pad wear. Owing to the long spring travels, the spring elements can be tolerant with regard to spring forces. The spring travels lead to a constant spring rate with low tolerances.

In a preferred design variant, only two springs are used.

The spreading elements may be formed from inexpensive and geometrically flexible metal sheets.

As a result of the offset with different centers of rotation, it is possible to replicate a relatively low spring rate (see patent 4943—FIG. 2). There is advantageously no need for a large number of windings (expensive, bulky).

Further advantages are:

Adjustability (of the centring)

Spring constants adaptable for each pad side, hence different for inside/outside and better adaptable to surroundings—within limits Installation by way of center centring stirrup—compensates uneven force build-up Possible "active" caliper centring Active pad suspension by way of "fork" on the end of the spider Other objects, advantages and novel features of the present invention will become apparent from the following detailed description of one or more preferred embodiments when considered in conjunction with the accompanying drawings.

BRIEF DESCRIPTION OF THE DRAWINGS

FIG. 9 shows a detailed view of a portion of the disk brake in FIG. 8.

FIG. 10 shows a view of the disk brake in FIG. 8 with components removed for clarity.

FIG. 11 shows a detailed view of a portion of the spreading device arrangements in FIG. 8.

FIG. 12 shows another detailed view of a portion of the spreading device arrangements in FIG. 8.

FIG. 13 shows the spreading device in FIG. 8.

DETAILED DESCRIPTION OF THE DRAWINGS

Figure 1:
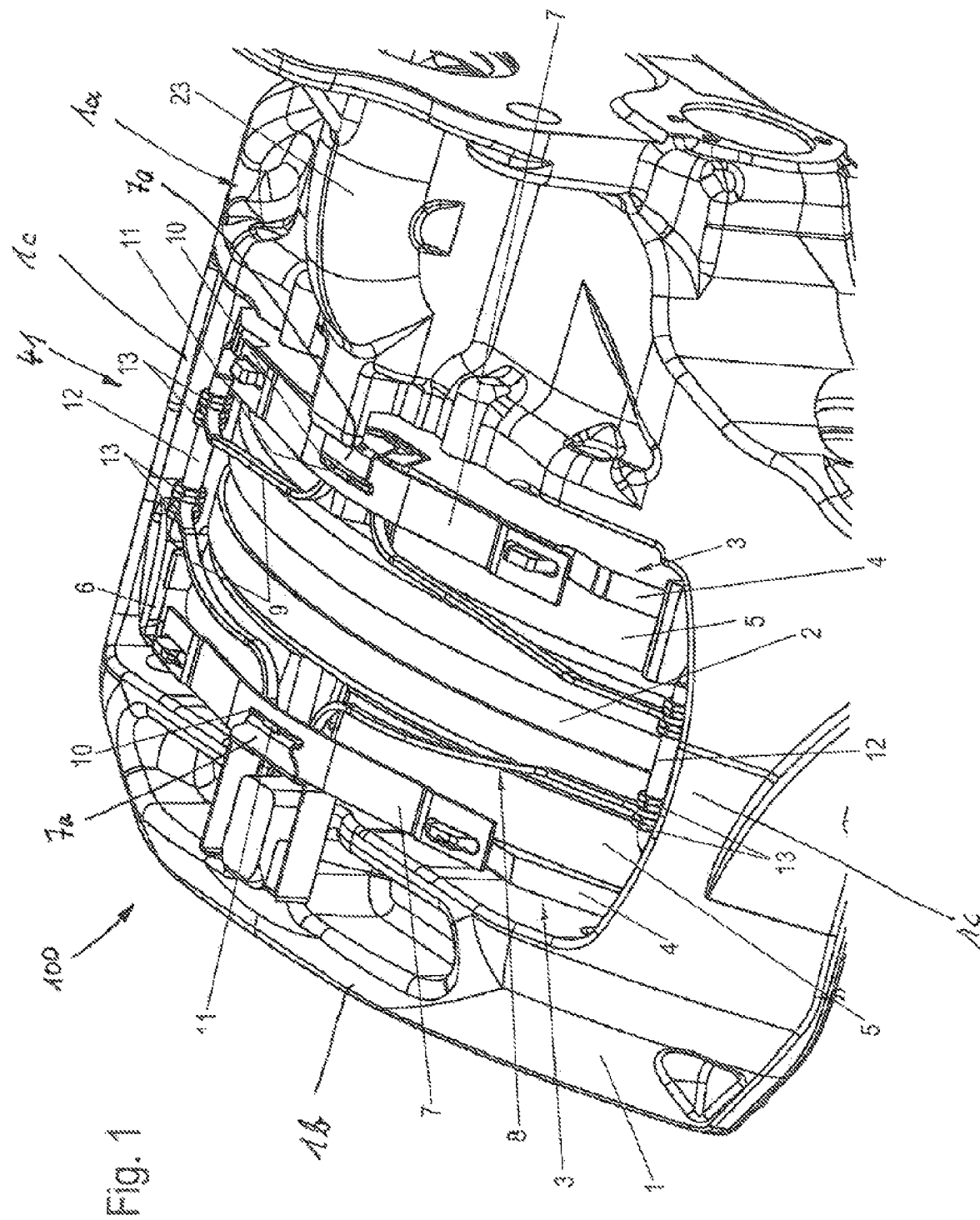
FIG. 1 shows a detail of a disc brake according to an embodiment of the invention in a perspective plan view.

FIG. 1 shows a part of a disc brake 100 for a utility vehicle, having a brake caliper 1 which engages over a brake disc 2. The brake disc 2 has a brake disc axis of rotation 2a (see FIG. 29). The brake caliper 1 is attached to a brake carrier 6, and is displaceable relative to the brake disc 2 axially in the direction of the brake disc axis of rotation 2a. The brake caliper 1 is mounted on guide beams (not illustrated) which are connected to the brake carrier 6 which is held in positionally static fashion on the vehicle.

The brake caliper 1 comprises an application section 1a, a caliper rear section 1b and two tension struts 1c. The application section 1a holds an application device (not shown) of the disc brake 100. The application section 1a runs with one side parallel to the plane of the brake disc 2 on one side of the brake disc 2. The caliper rear section 1b is arranged on the other side of the brake disc 2, likewise so as to run parallel to the brake disc 2. The caliper rear section 1b is connected to the application section 1a at in each case one end by way of in each case one tension strut 1c. Here, the tension struts 1c run substantially at right angles to the application section 1a and to the caliper rear section 1b. In this arrangement, the application section 1a, the caliper rear section 1b and the tension struts 1c define, between them, a central opening 41 which extends over the brake disc 2. The opening 41 has an imaginary longitudinal central line which lies in the plane of the brake disc 2 and which connects the imaginary centers of the tension struts 1c. Furthermore, the opening 41 has a further imaginary transverse central line which connects an imaginary center of the application section 1a to an imaginary center of the caliper rear section 1b. The longitudinal central line and the transverse central line intersect at an imaginary center point, which in this case is referred to as the virtual center of the opening 41.

In the brake carrier 6 there are arranged brake pads 3 which, during a braking operation, can be pressed against the brake disc 2 at both sides. Here, each brake pad 3 has a pad carrier plate 4 and a friction pad 5 fastened to said pad carrier plate on the side facing toward the brake disc 2, which friction pad is, during the functional operation thereof, that is to say during a braking operation, pressed against the brake disc 2.

The brake pads 3 are accessible, for an exchange and for maintenance, through the central opening 41. Said brake pads can, through said central opening 41, be inserted into their associated pad slots and removed from said pad slots again. The pad slots are defined in each case laterally by brake carrier horns 25 (see FIG. 8).

Braking is performed by way of the application device arranged in a receiving space in the application section 1a of the brake caliper 1, which application device has a brake lever which is positioned in a dome 23 of the brake caliper 1. The associated brake pad 3, referred to as action-side or application-side brake pad, is the first to make contact with the brake disc 2 during a braking operation. During the further course of the braking operation, reaction forces that occur cause the brake caliper 1 to be displaced in the opposite direction, driving the reaction-side brake pad 3 along until the latter likewise comes into frictional contact with the brake disc 2.

After a release of the brake, the two mutually oppositely situated brake pads 3 are, by way of a resetting device, released from the brake disc 2 to such an extent that said brake disc runs freely relative to the brake pads 3.

The resetting device is composed of at least one spreading device 8, which engages on the mutually oppositely situated brake pads 4, correspondingly to the invention, so as to act equally counter to the application direction.

In the example shown in FIG. 1, the spreading device 8 is composed of two flat springs 9 which are of mirror-symmetrical form but otherwise identical and which are retained on a pad retaining spring 7 of the respective pad carrier plate 4, for which purpose, on each flat spring 9, there is integrally formed a lug 11 which engages in positively locking fashion into a slot 10 of the pad retaining spring 7.

Figure 1A:
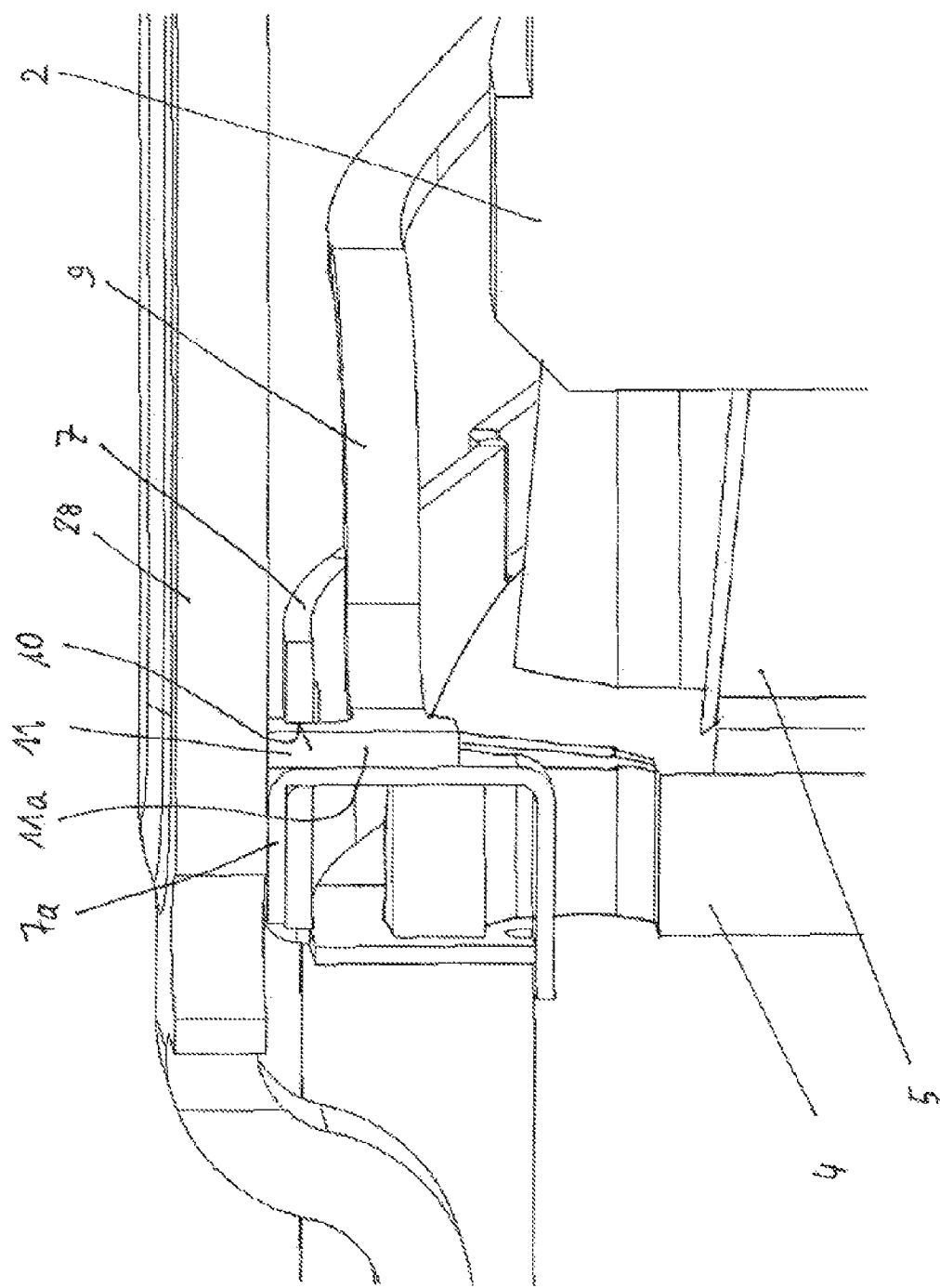
FIG. 1A shows an enlarged schematic partially sectional illustration of the disc brake as per FIG. 1.

For this purpose, FIG. 1a illustrates an enlarged schematic partially sectional illustration of the disc brake 100 as per FIG. 1. The section runs through a plane which is vertical in relation to FIG. 1 and which runs through the brake disc axis of rotation 2a.

That part of the flat spring 9 which is in contact with the pad carrier plate 4 is situated in a central section of the band spring 9, and in this case is referred to as thrust section 11a. The thrust section 11a is extended upward by the lug 11. In this example, the thrust section 11a lies against a clip element 7a which is attached, for the retention of the pad spring 7, to the pad carrier plate 4 in the central upper region thereof. A section of the clip element 7a extends through the slot 10 of the pad retaining spring 7. Said slot 10 is thus already provided and can be used for the positively locking engagement of the lug 11 of the flat spring 9.

That section of the clip element 7a whose outer side is in contact with the thrust section 11a of the band spring 9 lies with its inner side against the pad carrier plate 4. In this way, the thrust force of the thrust section 11a of the flat spring 9 is transmitted to the pad carrier plate 4. These explanations self-evidently also apply to the other flat spring 9.

Furthermore, FIG. 1a shows a pad retaining stirrup 28 (see also FIG. 8) which is arranged, over the brake pads 3, between the application section 1a and the caliper rear section 1b in the transverse direction of the opening 41 or in the direction of the brake disc axis of rotation 1a and which is fastened to said application section and caliper rear section. Here, the pad retaining stirrup 28 presses, by way of sections of its bottom side, against the clip elements 7a and thus against the pad retaining springs 7, whereby the brake pads 3 are held in their pad slots.

At the ends, the respective flat spring 9 is held in axially secured fashion on a stirrup 12 which is fastened to the brake carrier 6, wherein the two flat springs 9 are arranged spaced apart from one another. For an axial securing action, securing devices 13 are provided on the stirrup 12 so as to clamp the respective end of the flat spring 9 between them.

During an application movement of the brake pads 3, the flat springs 9 are correspondingly deformed, with a spring stress being built up, such that, after a release of the braking action, the brake pads 3 are pushed uniformly out of their braking position by the spring force that is provided.

Figure 2:
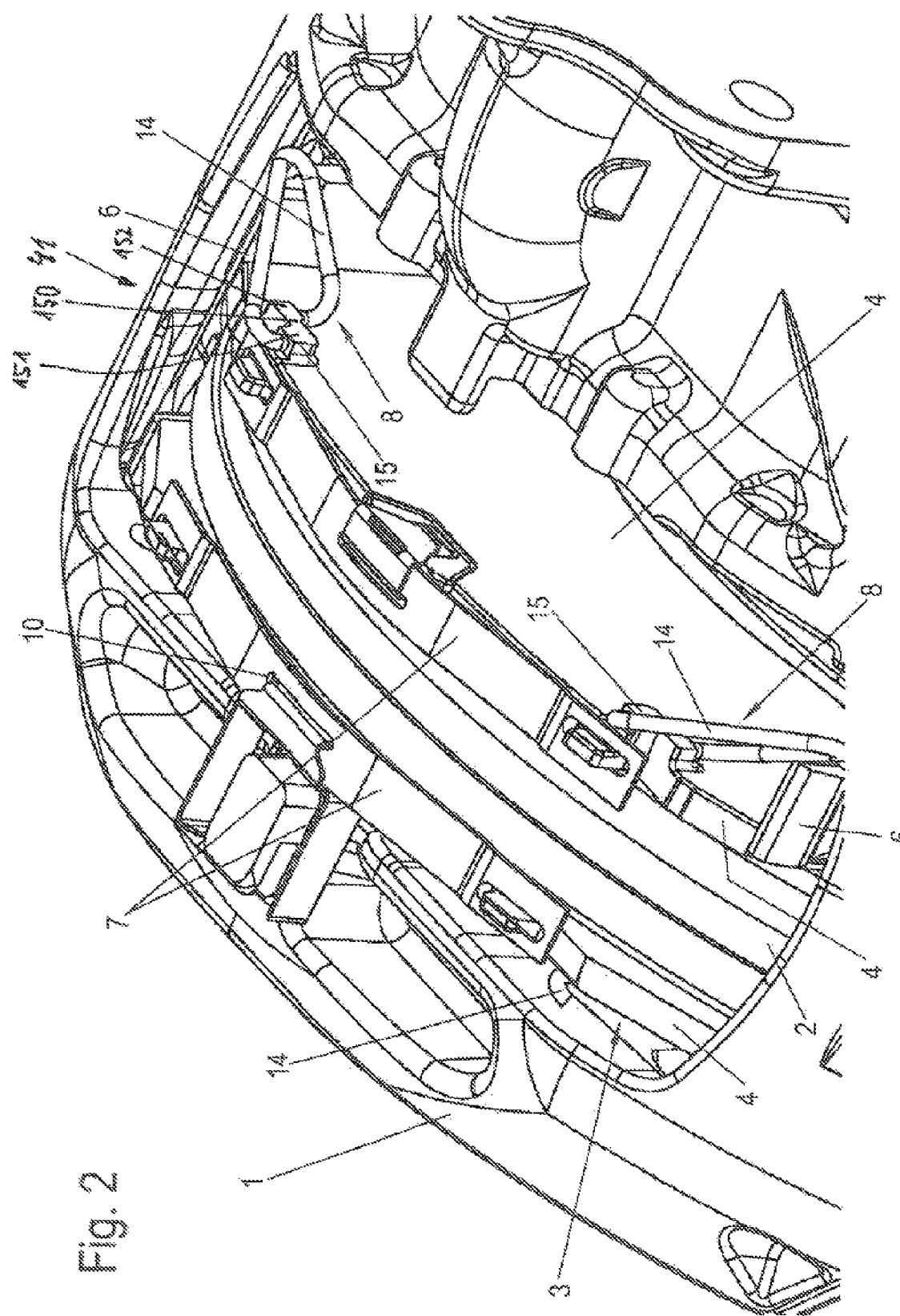
FIG. 2 shows a detail of a disc brake according to another embodiment of the invention in a perspective plan view.

FIG. 2 illustrates a further embodiment of the invention, in which the spreading device 8 is formed in each case from a spring stirrup 14, composed preferably of spring wire. Here, a spring stirrup 14 of said type is pivotably fixedly held on each end region of the pad carrier plate 4 on the side facing toward the pad retaining springs 7, for which purpose there is arranged on the pad carrier plate 4 a bracket 15 in which the ends of the spring stirrup 14 are, as viewed radially with respect to the brake disc 2, held rotatably so as to be offset relative to one another.

In FIG. 2, the bracket 15 includes, for each end of the spring stirrup 14, a rectangular mount section 151, 152 connected by way of a connection 150 such that the mount section 151 protrudes upward from the connection 150 and the mount section 152 protrudes downward.

The bracket 15 may for example be formed in one piece with the pad carrier plate 4, for example by mechanical machining. It is also possible for the bracket 15 to be fastened to the pad carrier plate 4.

Figure 24:
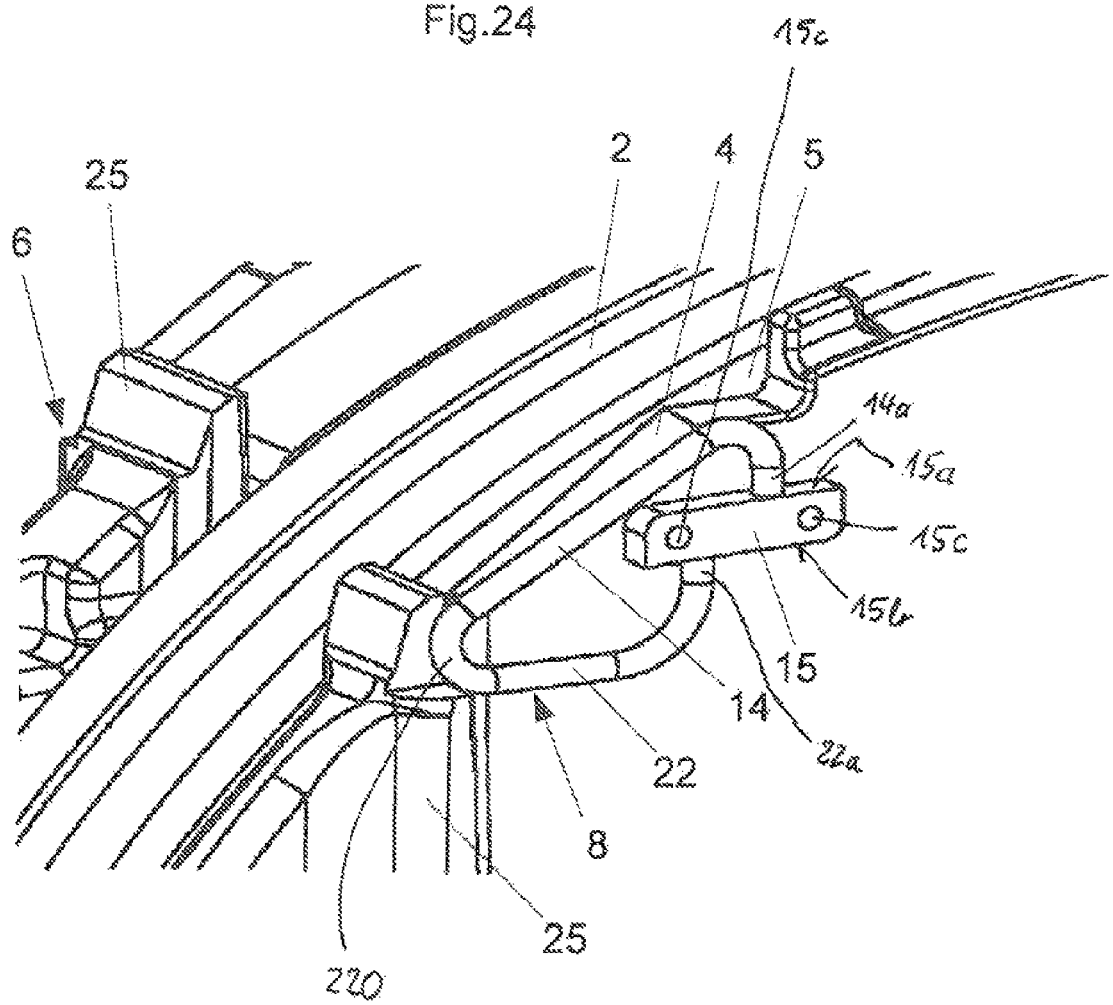
FIG. 24 shows another embodiment of a spreading device in accordance with the present invention.

The bracket 15 may also be, for example, a rectangular plate such as will be described in more detail further below (FIG. 24).

A spring stirrup 14 lies against in each case one associated brake carrier horn of the brake carrier 6, specifically on the side situated opposite the brake disc 2, such that, during an application movement of the brake pads 3, the spring stirrups 14 deform under stress. In the event of a release of the brake, the brake pads 3 are pushed back counter to their application direction by the spring force of the spring stirrups 14, similarly to the exemplary embodiment as per FIG. 1.

Figure 3:
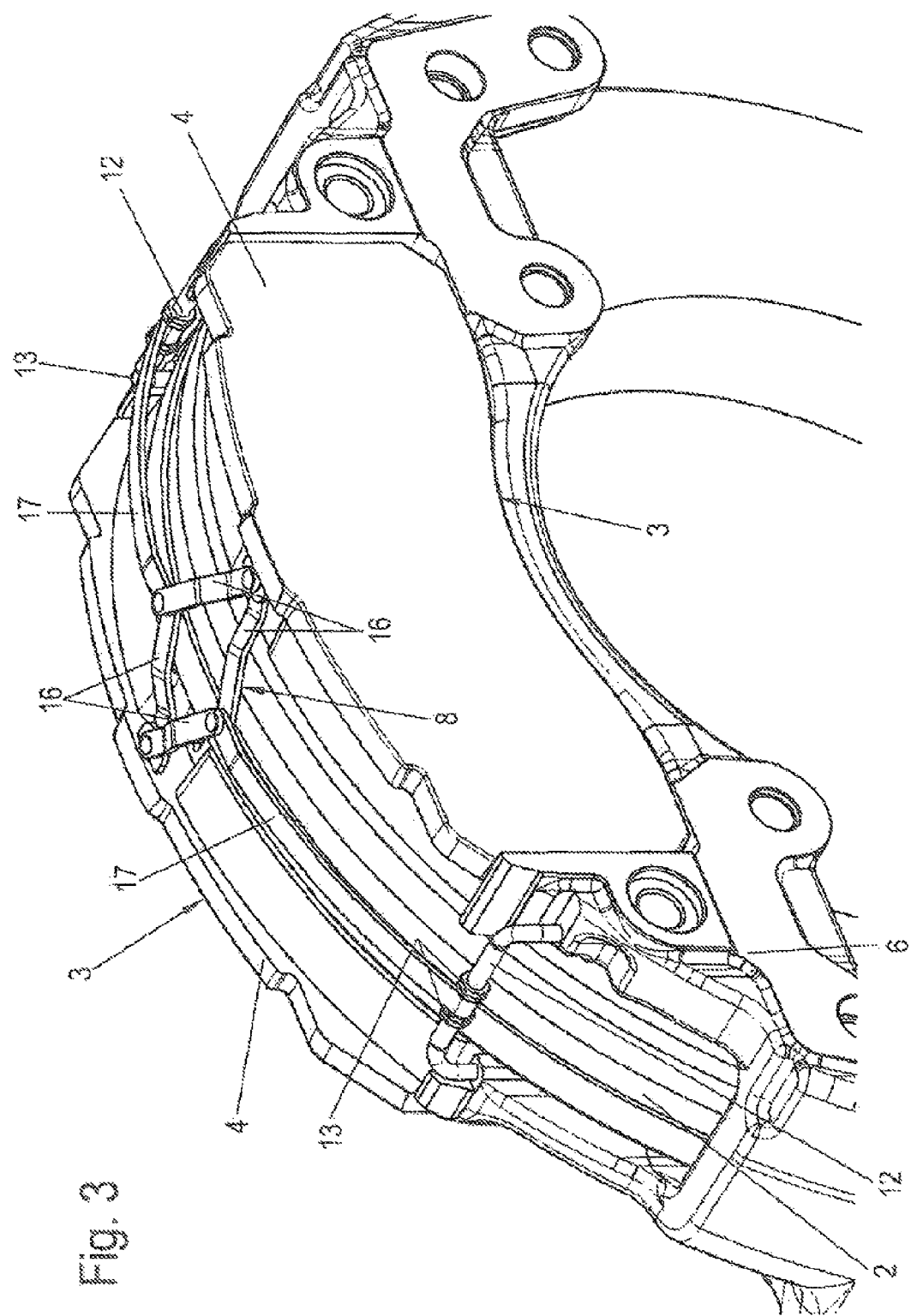
FIG. 3 shows a further embodiment of a spreading device in accordance with the present invention.

FIG. 3 illustrates a further embodiment of the spreading device 8, wherein here, the brake caliper has not been shown.

Said spreading device 8 is composed of two leaf springs 17 which are attached in each case stirrups 12 fastened to opposite sides of the brake carrier 6, each of which leaf spring carries, on the free ends thereof facing toward one another, two scissor elements 16, of which one is pivotably fastened to the action-side brake pad 3 and the other is pivotably fastened to the reaction-side brake pad 3.

The spring force to be imparted for the spreading action is, in this design variant, realized by way of the leaf springs 17, which arch radially outward during the application movement of the brake pads 3, and which straighten, during the release of the brake, correspondingly to the spring action, with the attached scissor elements 16 simultaneously being straightened and the brake pads 3 simultaneously being spread apart.

Figure 4:
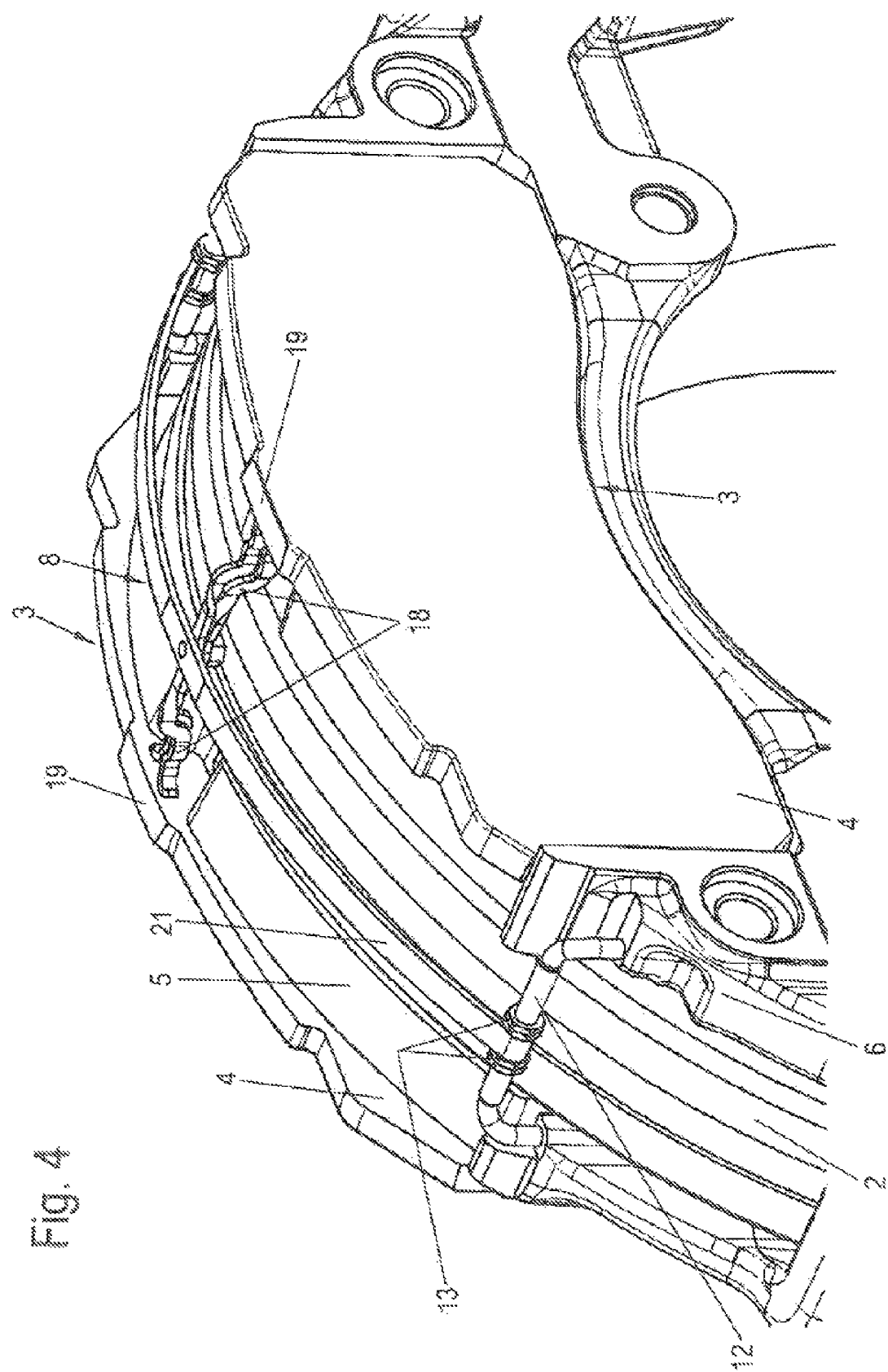
FIG. 4 shows another embodiment of a spreading device in accordance with the present invention.

FIG. 4 illustrates a further variant of the spreading device 8, which has two criss-crossing spring limbs 18 which are fastened articulatedly to a retaining bow 21. Said retaining bow is, similarly to the fastening of the leaf springs 17 to the brake carrier 6, likewise retained on stirrups 12 which are connected thereto, which extends centrally over the brake disc 2, in relation to the thickness thereof, over a part of the circumference.

The curved ends of the criss-crossing spring limbs 18 lie in each case against an abutment 19 of the pad carrier plate 4, such that said scissor-like construction spread in the event of an application movement of the brake, that is to say in the event of a movement of the brake pads 3 axially toward one another. Here, the spring limbs 18 are fastened to the retaining bow 21, such that the spring limbs 18 are preloaded during the application movement of the brake pads 3, and the brake pads 3 are spread apart from one another by said preload after a release of the brake.

Figure 5:
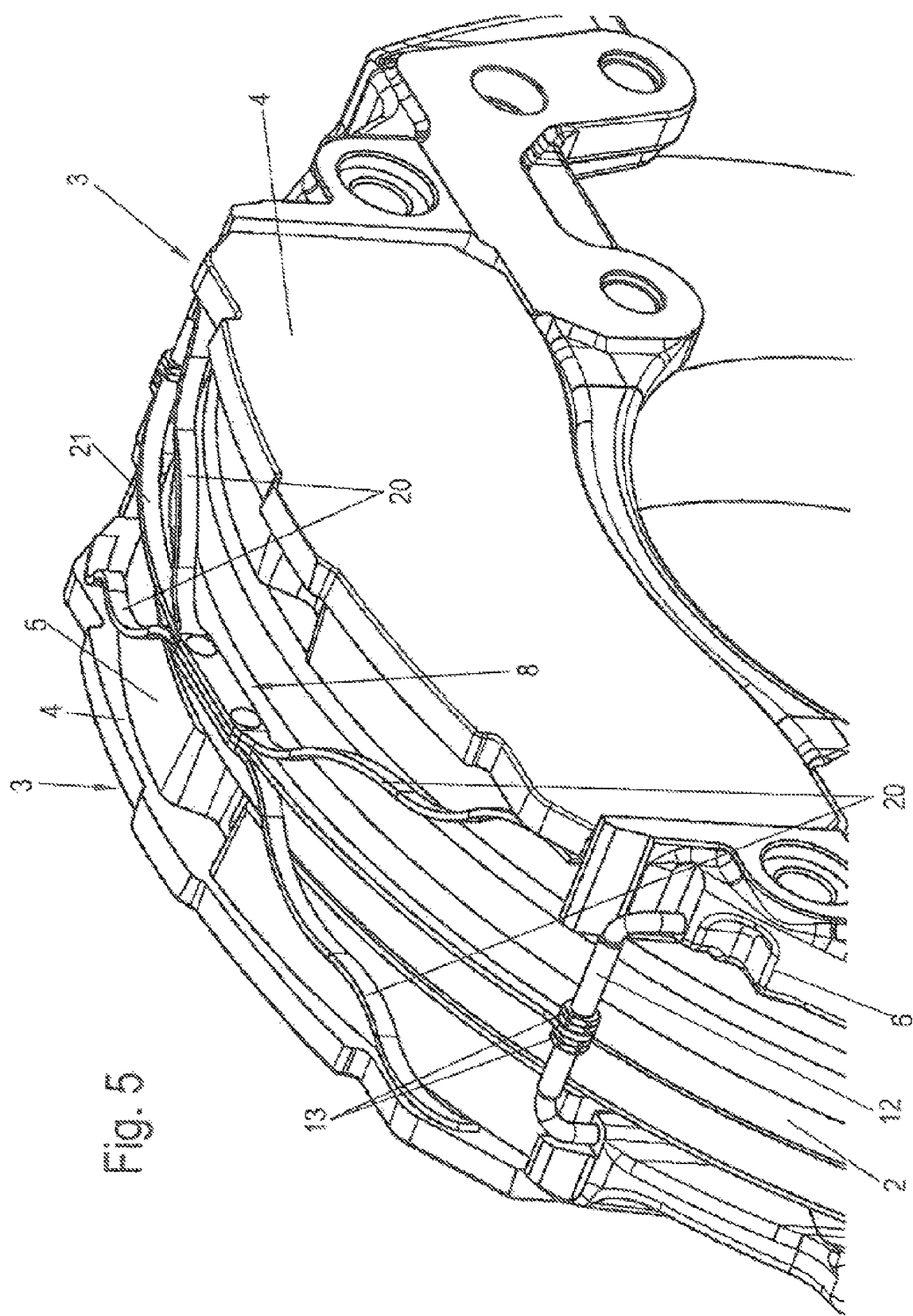
FIG. 5 shows another embodiment of a spreading device in accordance with the present invention.

FIG. 5 illustrates a spreading device 8 which is composed of two identical spring arms 20 which are connected to one another in the central region in the longitudinal direction of the opening 41 and likewise to a retaining bow 21 which is fastened to the brake carrier 6 by way of stirrups 12.

Here, the spring arms 20 lie against two mutually oppositely situated end regions of the pad carrier plate 4, specifically in an edge region that protrudes at the top side. The ends of the spring arms 20 are likewise curved, such that sliding on the pad carrier plate surface during the application and release of the brake is possible without problems. In this case, too, spreading of the brake pads 3 after a release of the brake is possible by way of the preload that is generated during the application movement.

Figure 6:
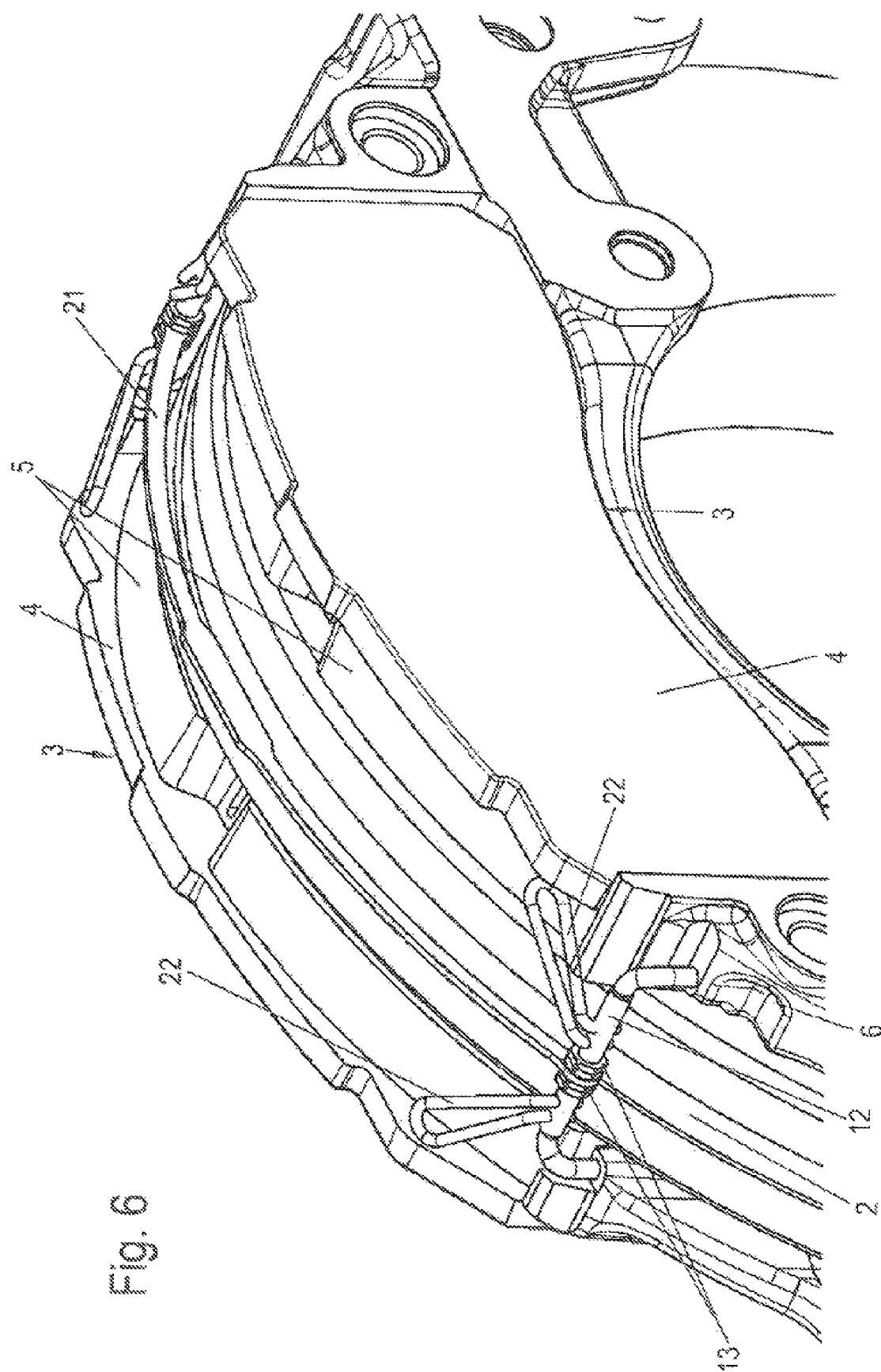
FIG. 6 shows another embodiment of a spreading device in accordance with the present invention.

In FIG. 6, each spreading device 8 is composed of an abutment limb 22 which is connected rotatably to the stirrup 12 and which is formed in loop-shaped form from a spring wire and which likewise, like the spring arms 20 as per FIG. 5, lies against the edge region of the respectively associated pad carrier plate 4, wherein the two resilient abutment limbs 22 of each side lie against those sides of the pad carrier plates 4 which face toward one another.

Figure 7:
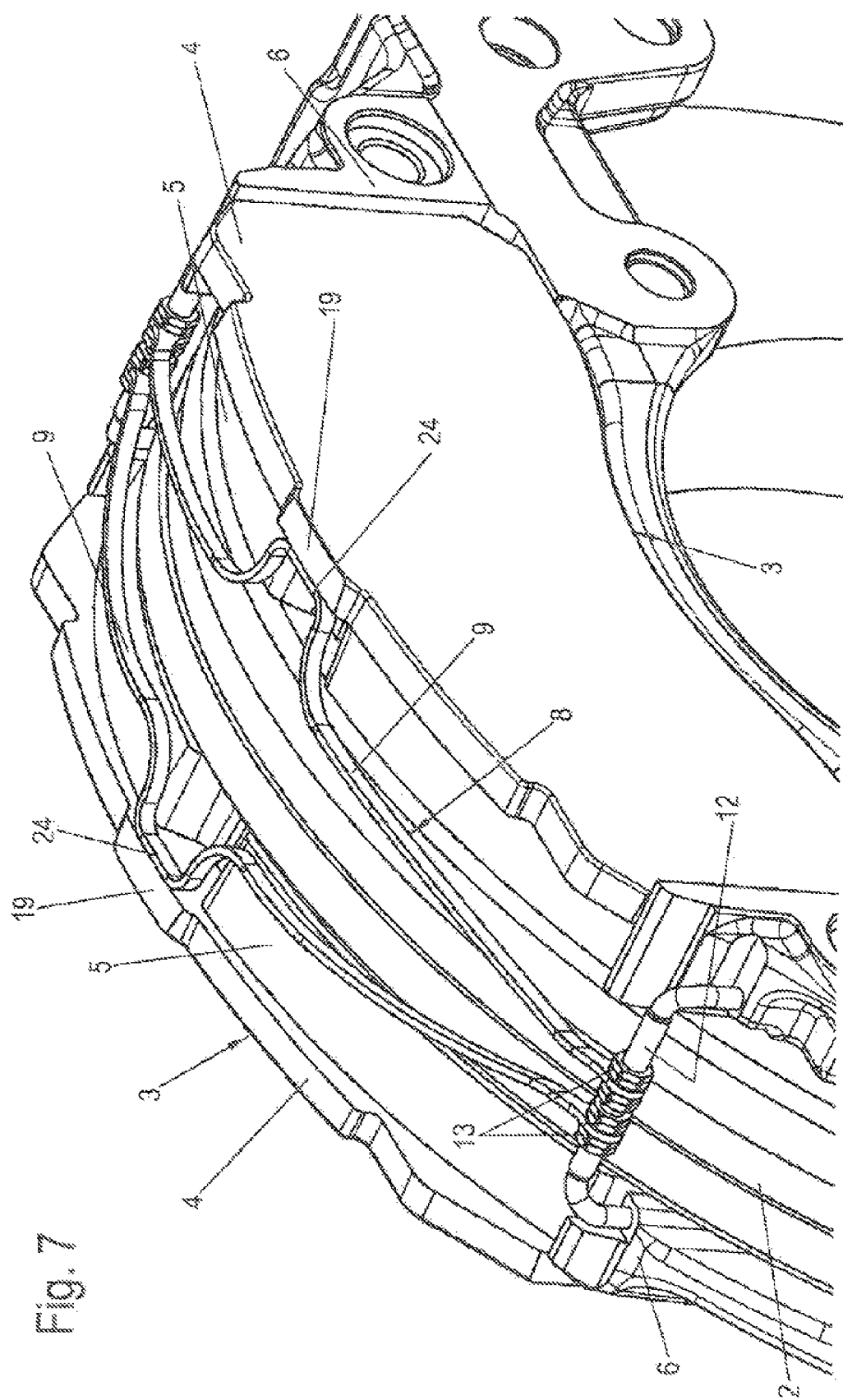
FIG. 7 shows another embodiment of a spreading device in accordance with the present invention.

Finally, FIG. 7 illustrates a further variant of the invention, which is substantially similar to the embodiment as per FIG. 1. In this case, too, the flat spring 9 assigned to in each case one brake pad 3 engages centrally on the pad carrier plate 4, preferably on an abutment 19, wherein, for this purpose, the flat spring 9 is equipped with a turned-out abutment stirrup 24.

For the central adjustment of both flat springs 9 in relation to the brake disc 2, the flat springs 9 are fastened in axially displaceable fashion to the two mutually oppositely situated stirrups 12.

Figure 8:
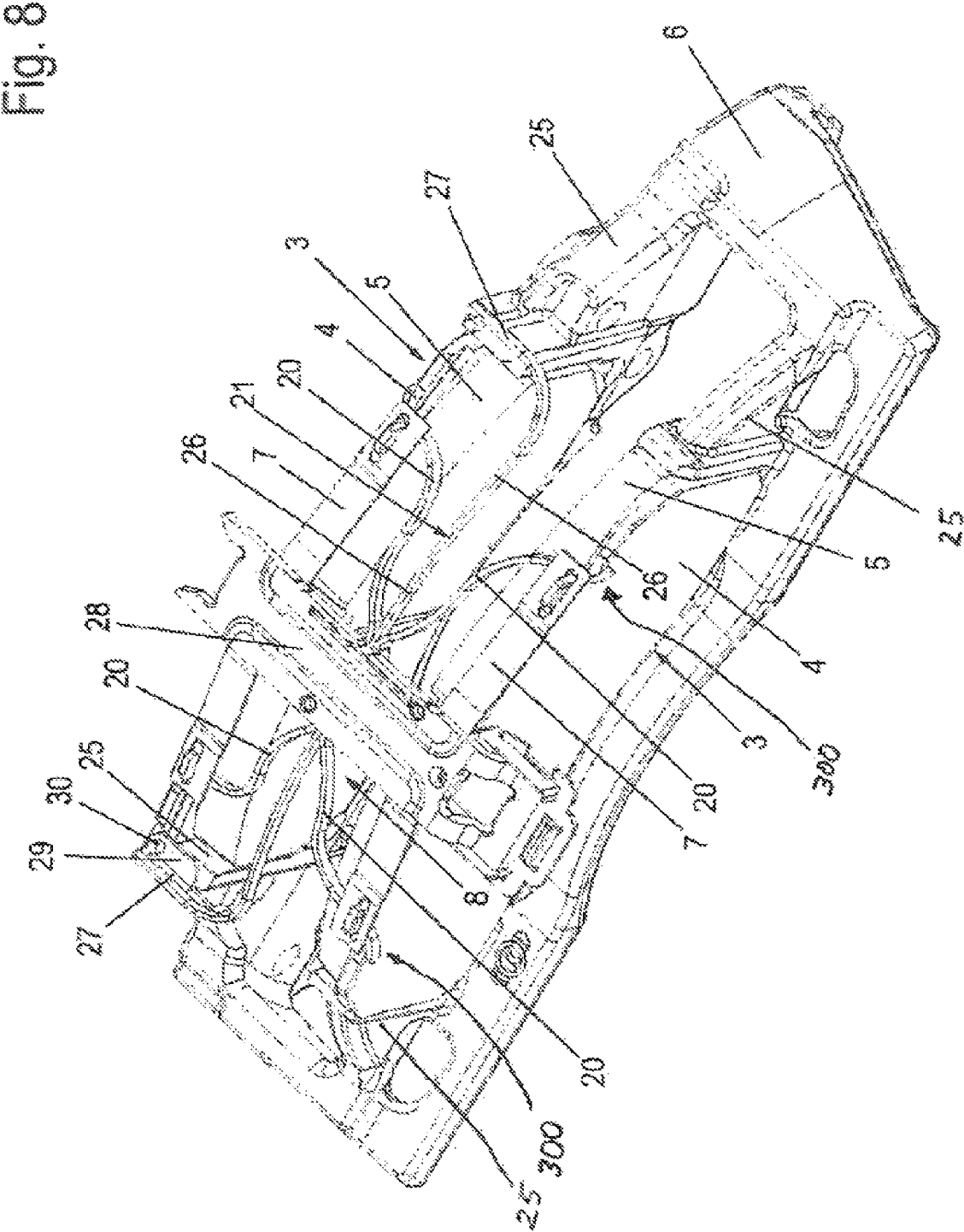
FIG. 8 shows a further embodiment of a spreading device in accordance with the present invention.

In the example shown in FIG. 8, the retaining bow 21 is of C-shaped form, having a center limb 26 which is arranged centrally in relation to the thickness of the brake disc 2 and which extends in the circumferential direction of said brake disc and which is adjoined at both sides by in each case one angled end limb 27.

In FIG. 9, which shows a detail of a complete disc brake 100, whereas FIG. 8 shows merely the brake carrier 6 with the inserted brake pads 3, it can be clearly seen, as in FIG. 10, that the end limbs 27 are equipped, on the sides facing toward one another, with lugs 29, on which there are held pegs 30 which engage into bores 25a (see FIG. 26) of the brake carrier horns 25.

Here, the retaining bow 21 thus forms a centring device for the brake caliper 1, as the brake carrier 6, to which the retaining bow 21 is fastened, forms a positionally static part which is mounted so as to be displaceable relative to the brake caliper 1, such that, after a release of the brake and a spreading movement of the spreading device 8, that is to say after the brake pads 3 have been pushed apart, the brake caliper 1 is guided into a centered position.

FIG. 10 furthermore shows the brake pads 3 with the spreading device 8 and the retaining bow 21 on their own.

In FIGS. 8 and 9, it can also be seen that a pad retaining stirrup 28 that is held on the brake caliper 1 is supported on the pad retaining springs 7 of the brake pads 3, and holds down and braces the retaining bow 21.

As can be seen from FIG. 10, the spring arms 20 of the spreading device 8 are fixedly connected to one another in the central region, correspondingly to FIG. 5.

It can also be seen in FIGS. 9 and 10 that the spring arms 20 have, in each case at their free end, support limbs 31 which are supported on those edges of the pad carrier plates 4 which are assigned to the pad retaining springs 7, by which support limbs the spring arms 20 are prevented from departing from their position of abutment against the respective pad carrier plate 4 in the event of vibration movements during driving operation. Here, the support limbs 31 are braced between the pad retaining springs 7 and the associated pad carrier plate 4, wherein the pad carrier plate 4 has a cutout (not illustrated) through which the respective support limb 31 is guided. Tilting of the spring arms 20 is thus prevented.

This can be seen in an enlarged illustration in FIG. 11, which furthermore shows a pressure-exerting limb 32, integrally formed in curved fashion on the spring arm 20, of a spring end 300, which pressure-exerting limb lies against that edge surface of the pad carrier plate 4 which faces toward the friction pad 5, and which pressure-exerting limb, as stated above, forms a tilting prevention means. Moreover, the friction pad 5 is prevented from striking the spring arm 20. Here, the support limb 31, which lies on a narrow side, facing away from the brake carrier 6, of the pad carrier plate 4, and the pressure-exerting limb 32 form the prongs of a fork with a slot 301 as which the spring end 300 of the spring arm 20 is formed. As already mentioned, the spring end 300 of the spring arm 20 in the abutment region with the pad carrier plate 4, that is to say the pressure-exerting limb 32, is convexly curved in the direction of the pad carrier plate 4, in order to thereby ensure obstruction-free sliding on the pad carrier plate 4.

The support limb 31 of the spring end 300 lies by way of a bearing section 31a of its bottom side, facing toward the slot 301, on a bearing surface 305 of the top side of the pad carrier plate 4. The pressure-exerting limb 32 is in contact by way of an abutment section 32a, which points toward the pad carrier plate 4, with an abutment surface 303 of the pad carrier plate 4. The abutment surface 303 is situated on that side of the pad carrier plate 4 to which the friction pad 5 is applied. Here, the abutment surface 303 is arranged above the friction pad 5 in an end region of the pad carrier plate 4.

The bearing surface 305 on the top side of the pad carrier plate 4 may be arranged at an angle 306 with respect to an imaginary horizontal, said angle having a magnitude in a range of for example 5 to 15°.

The bearing surface 305 forms a guide for the support limb 31 of the spring end 300 of the spring arm 20 during the movements thereof in movement directions 302 (for example owing to wear compensation) and an abutment for said support limb in a direction toward the top side of the pad carrier plate 4.

Furthermore, the contact between the abutment surface 305 of the pad carrier plate 4 and the support limb 31 of the spring end 300 of the spring arm 20 forms a spring-loading for the brake pad 3 in a radial direction. Furthermore, the pad carrier plate 4 and thus the brake pad 3 are pushed downward into their pad slot, and spring-loaded, as a result of said points of contact with the support limbs 31 of the spring ends 300. If the spreading device 8 is fixed for example as shown in FIG. 1A by the pad retaining stirrup 28, it is also possible under some circumstances for the brake pads 3 to be formed without pad retaining springs 7.

The abutment surface 303 forms a guide for the pressure-exerting limb 32 of the spring end 300 of the spring arm 20 during the movements thereof in movement directions 302 (for example in the event of wear compensation) and an abutment for said pressure-exerting limb in a direction toward the pad carrier plate 4 parallel to a brake disc axis of rotation 2a.

In an embodiment which is not shown, the abutment surface 303 may protrude from the pad carrier plate 4 or may be formed into the pad carrier plate 4, for example as a groove.

The abutment surface 303 and the bearing surface 305 may, as guide surfaces, be provided with a particular surface treatment, for example by grinding, such that they have a low friction resistance.

It is also possible for a projection 304 to be provided which protrudes from the pad carrier plate 4 toward the spring end 300 into the slot 301. In this way, the projection forms an additional guide for the spring end 300.

FIG. 12 shows an enlarged detail of the retaining bow 21 in the region of attachment to the brake carrier horn 25, wherein the lug 29 lies on a planar face side of the brake carrier horn 25. The peg 30 may be in the form of a rivet and plugged into a bore 25a (see FIG. 26) of the brake carrier horn 25. It is also possible for the peg 30 to be integrally formed on the brake carrier horn 25, or to have already been fixedly inserted as a separate component.

FIG. 13 shows the spreading device 8 as per FIGS. 8-13 as a detail. Here, at the free ends of the spring arms 20, respective spring ends 300 are formed as bent pressure-exerting limbs 32. The pressure-exerting limbs 32 each have the abutment section 32a already indicated above in FIG. 11. Furthermore, the pressure-exerting limbs 32 are in this case equipped, on their bottom sides, with a respective bearing section 32b which, for bearing contact as will be discussed in more detail below, is provided with a suitable surface condition with a low coefficient of friction.

Figure 13A:
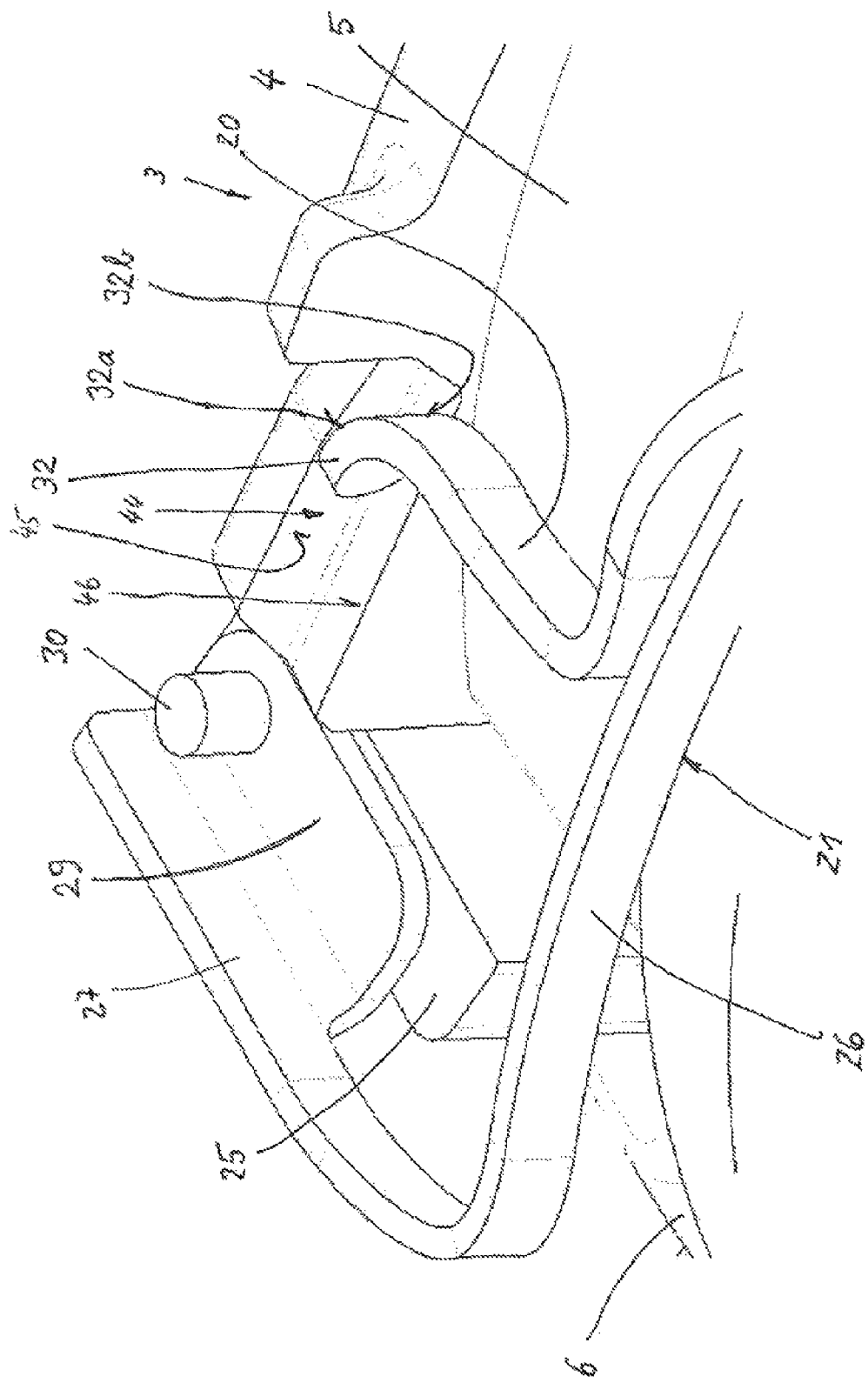
FIG. 13A shows a detailed view of a portion of the spreading device in FIG. 13.

FIG. 13A shows, in this regard, an enlarged detail view of the end region of a pad carrier plate 4 of a brake pad 3 together with a pressure-exerting limb 32 of said type. The brake pad 3 has been inserted in its pad slot between two brake carrier horns 25, of which only one is illustrated here. As described above in conjunction with FIG. 12, an end limb 27 of the retaining bow 21 has been attached to said brake carrier horn 25.

The end region of the pad carrier plate 4 is in this case equipped with a support section 44 which is formed into the pad carrier plate 4, for example by mechanical machining. The support section 44 has an abutment surface 45 and a bearing surface 46.

The abutment surface 45 runs parallel to, and so as to be offset with respect to, that side surface of the pad carrier plate 4 which is equipped with the friction pad 5, wherein the abutment surface 45 is spaced apart from said side surface in the direction of the brake disc axis of rotation 2a, that is to say axially, by an axial depth of the abutment surface 46.

The pressure-exerting limb 32 is arranged in the support section 44 and is in contact, by way of its abutment section 32a, with the abutment surface 45. At the same time, the pressure-exerting limb 32 lies by way of its bearing section 32b on the bearing surface 46. The pressure-exerting limb 32 is thus, during its movement, guided by the support section 44 as a result of its contact therewith. The abutment surface 45 and the bearing surface 46 may, by way of machining, be provided with particular friction characteristics for said movement.

Furthermore, the pad carrier plate 4 and thus the brake pad 3 are pushed downward into their pad slot, and spring-loaded, as a result of said points of contact with the pressure-exerting limbs 32 of the spring ends 300. If the spreading device 8 is fixed for example as shown in FIG. 1A by the pad retaining stirrup 28, it is also possible under some circumstances for the brake pads 3 to be formed without pad retaining springs 7.

Figure 14:
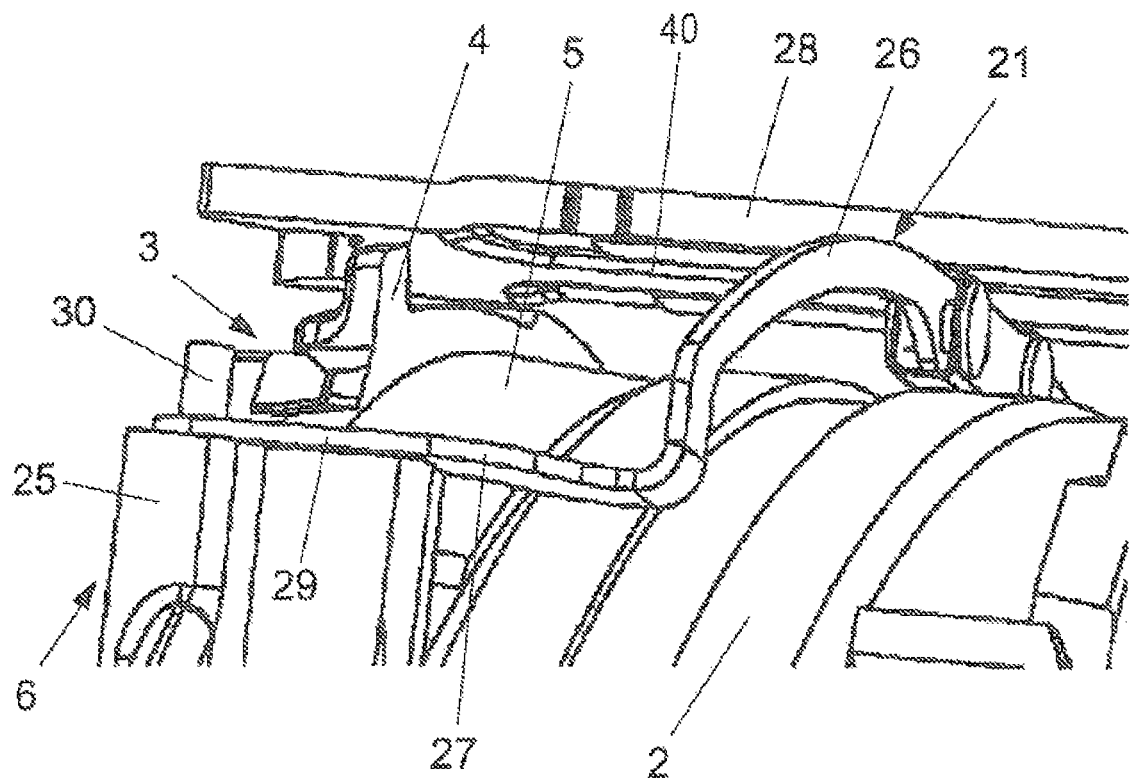
FIG. 14 shows a detailed view of a portion of an attachment region of a retaining bow over a spreading device in accordance with an embodiment of the present invention.

FIG. 14 shows a detail of the attachment region of the retaining bow 21 on the brake carrier horn 25 in an enlarged view. Here, as a tilting prevention means, a retaining plate 40 is provided which is fastened to the center limb 26 and against which the pad retaining stirrup 28 lies.

By contrast to the exemplary shown in FIG. 13, the lug 29 is not angled relative to the end limb 27 but rather is formed by said end limb so as to have the same profile, by way of corresponding shaping of the retaining bow 21.

Figure 15:
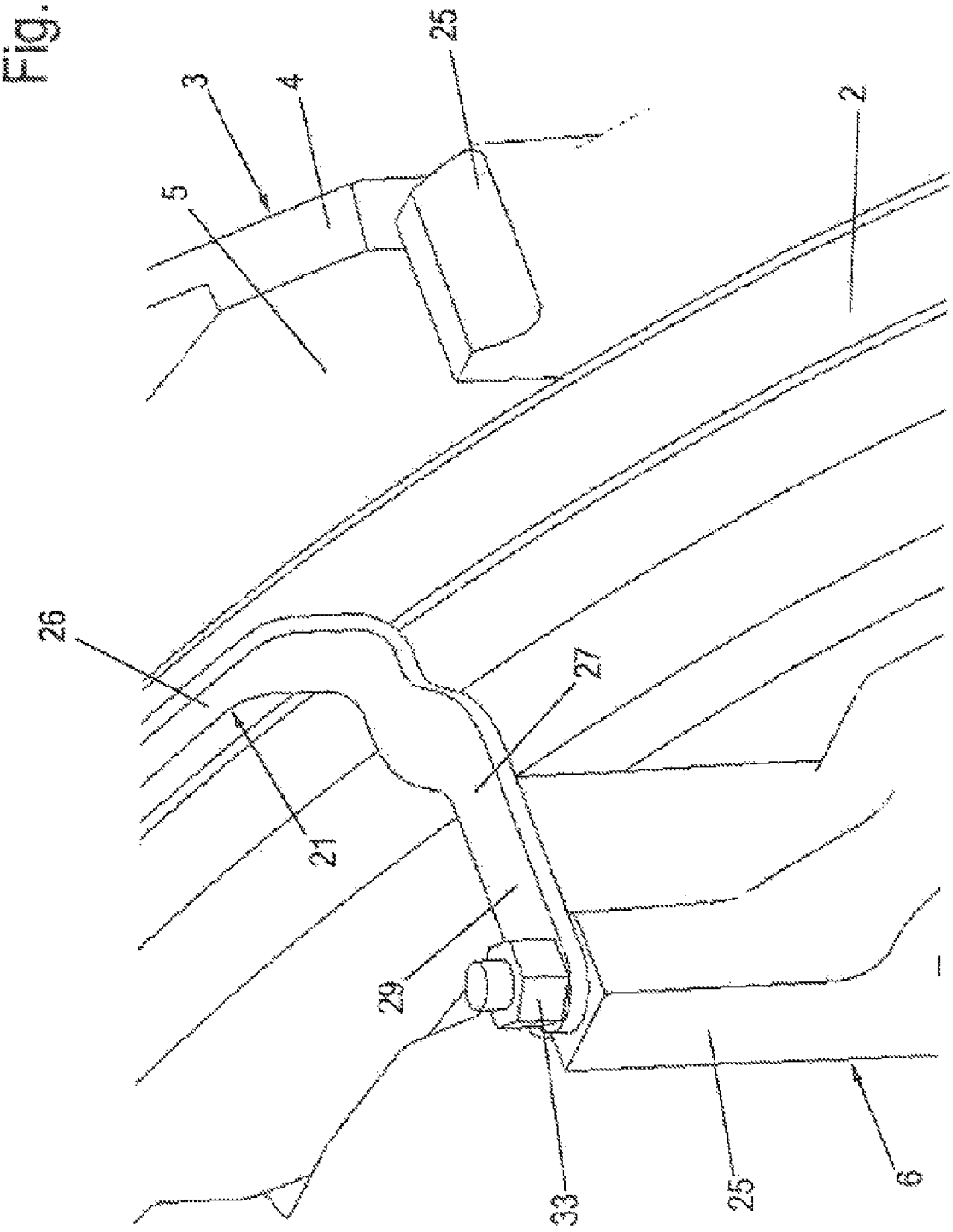
FIG. 15 shows another embodiment of an end of a spreading device in accordance with the present invention.

A similar design variant to this is illustrated in FIG. 15, in which, however, the securing of the end limb 27 or of the lug 29 is realized by way of a nut 33 which is screwed onto a threaded peg of the brake carrier horn 25 and which holds the lug 29 on the brake carrier horn 25.

Figure 16:
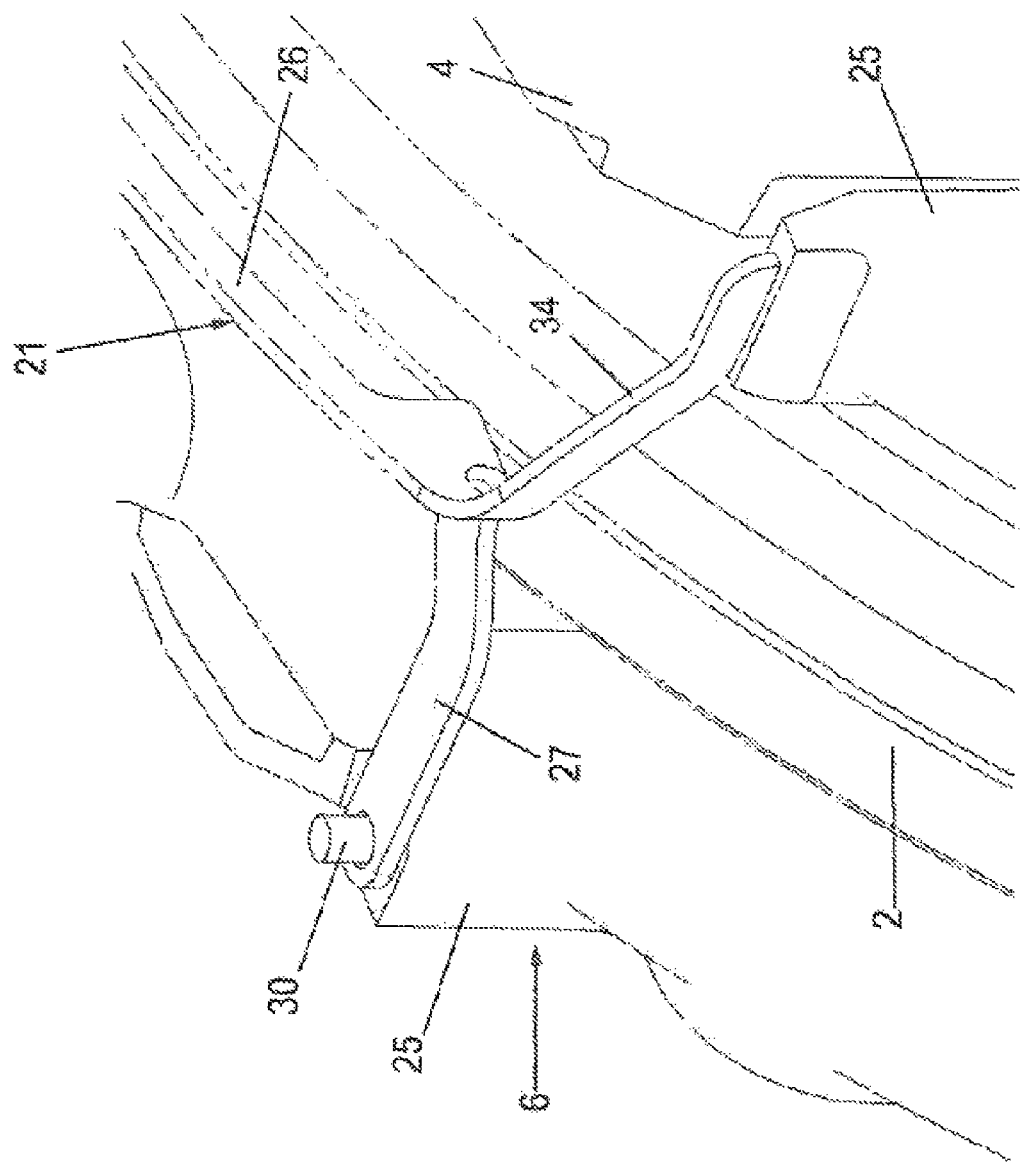
FIG. 16 shows another embodiment of an end of a spreading device in accordance with the present invention.

In FIG. 16, a support lug 34 is angled oppositely to the end limb 27 of the retaining bow 21, which support lug lies on the face side of the associated brake carrier horn 25 and, similarly to the support limb 31 as per FIG. 11, forms a radial securing means for the retaining bow 21 and thus for the spreading device 8.

Figure 17:
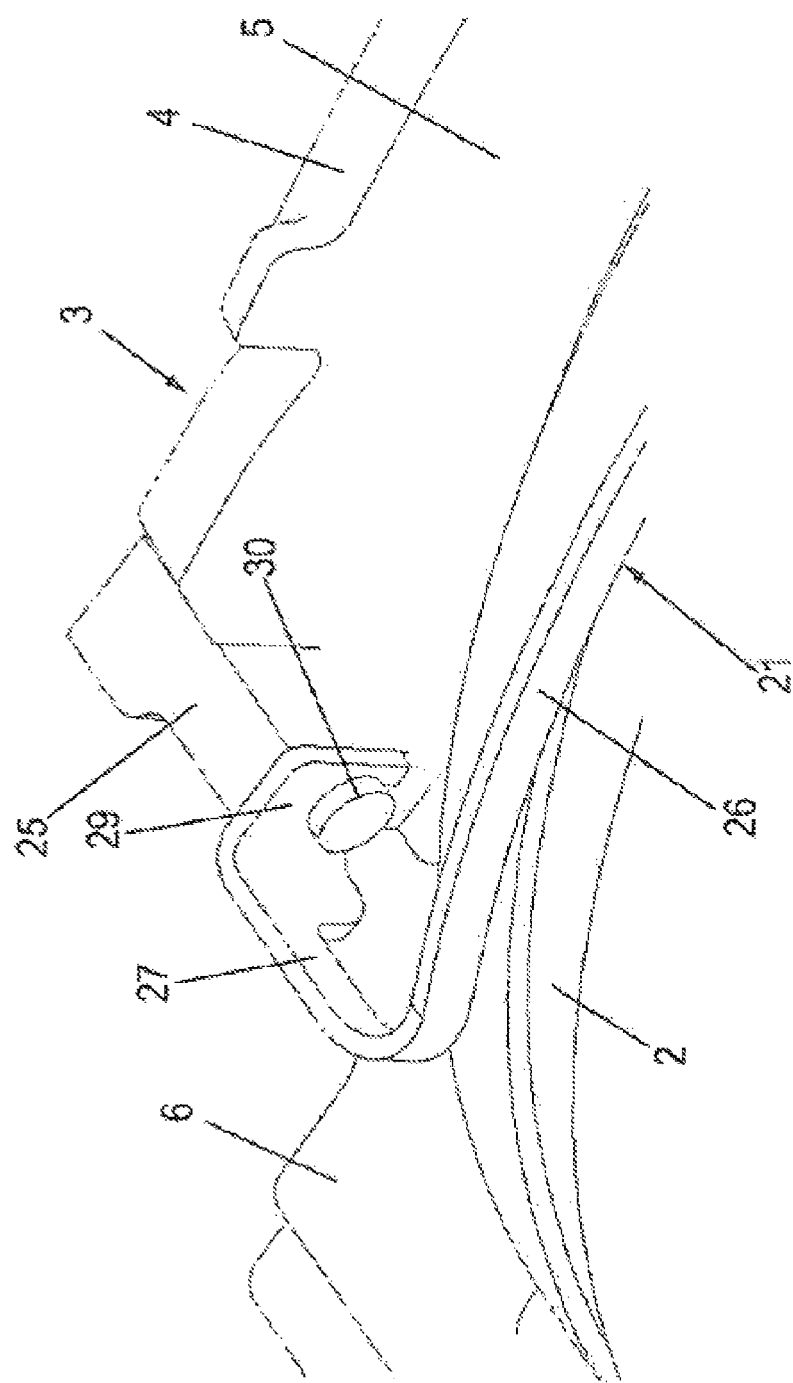
FIG. 17 shows another embodiment of an end of a spreading device in accordance with the present invention.

A further variant of the fastening of the retaining bow 21 to the brake carrier horn 25 can be seen in FIG. 17, which illustrates an enlarged detail of the corresponding region of the brake carrier 6.

Here, in this case, the end limb 27 is, at the end side, angled so as to be approximately parallel to the center limb 36 and is plugged onto the peg 30 that is fastened in the brake carrier horn 25.

Figure 18:
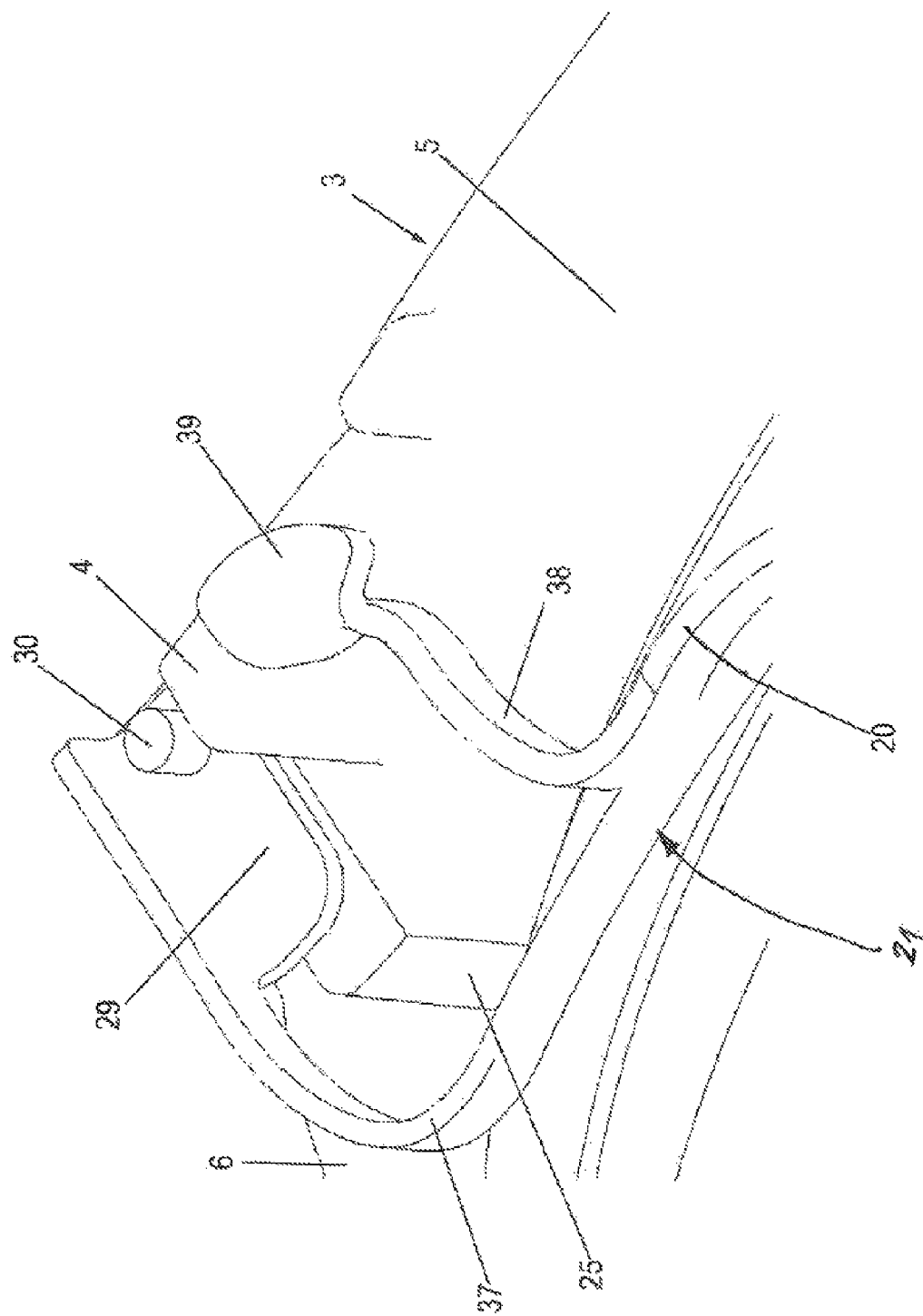
FIG. 18 shows another embodiment of an end of a spreading device in accordance with the present invention.

FIG. 18 illustrates a design variant of the spreading device 8 in which the spring arms 20, of which the end section of a spring arm 20 is illustrated, performs both the function of the retaining bow 21 and the spreading function.

For this purpose, the spring arm 20 is, in its end region, split in the longitudinal direction, with a spring web 38 and an attachment web 37 being formed. Here, the spring web 38, which is equipped with an angled lug 39 integrally formed on the end side, performs the spreading function, that is to say is, during the braking-induced displacement of the brake pad 3, braced counter to the spring force, and, after the release of the brake, forces the brake pad 3 into its end position, wherein the angled lug lies against the pad carrier plate 4 both in the bracing direction and in the radial direction, that is to say lies against the upper edge of the pad carrier plate 4.

By contrast, the attachment web 37 is equipped, on the end, with a lug 29 which has a peg 30, wherein the peg 30 is plugged into a bore 25a (see FIG. 26) of the brake carrier horn 25 in order, as described, to permit centring of the brake caliper 1 after a braking process.

Figure 19:
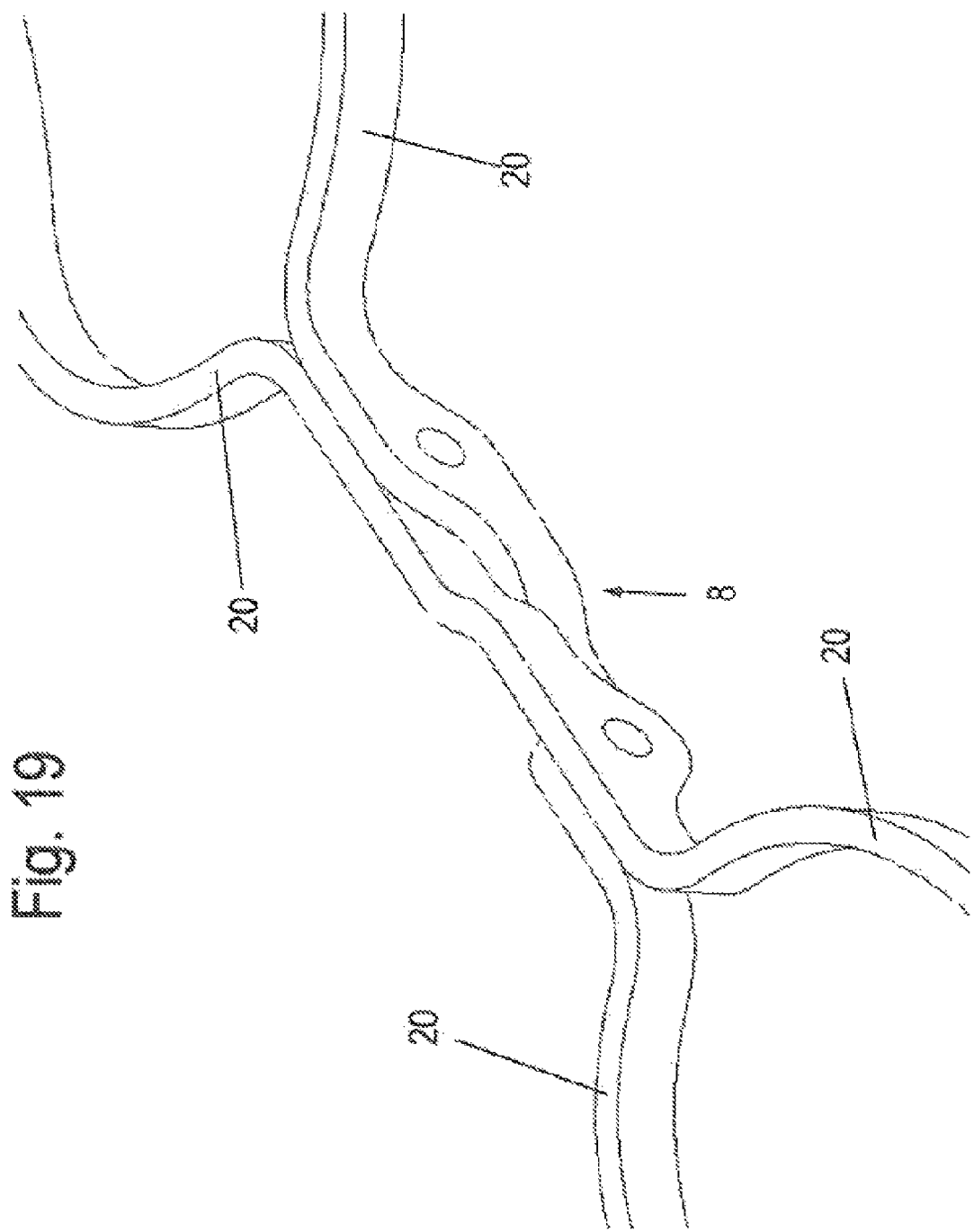
FIG. 19 shows another embodiment of a spreading device in accordance with an embodiment of the present invention.

FIG. 19 shows the central region of a further embodiment of the spreading device 8, in which the spring arms 20 are formed from two criss-crossing individual springs which are fixedly connected to one another in the central region. Here, a spring arm 20 of one individual spring lies against one pad carrier plate 4 and the other spring arm of said individual spring lies against the other, opposite pad carrier plate 4, with a similar situation applying to the spring arms 20 of the other individual spring.

Figure 20:
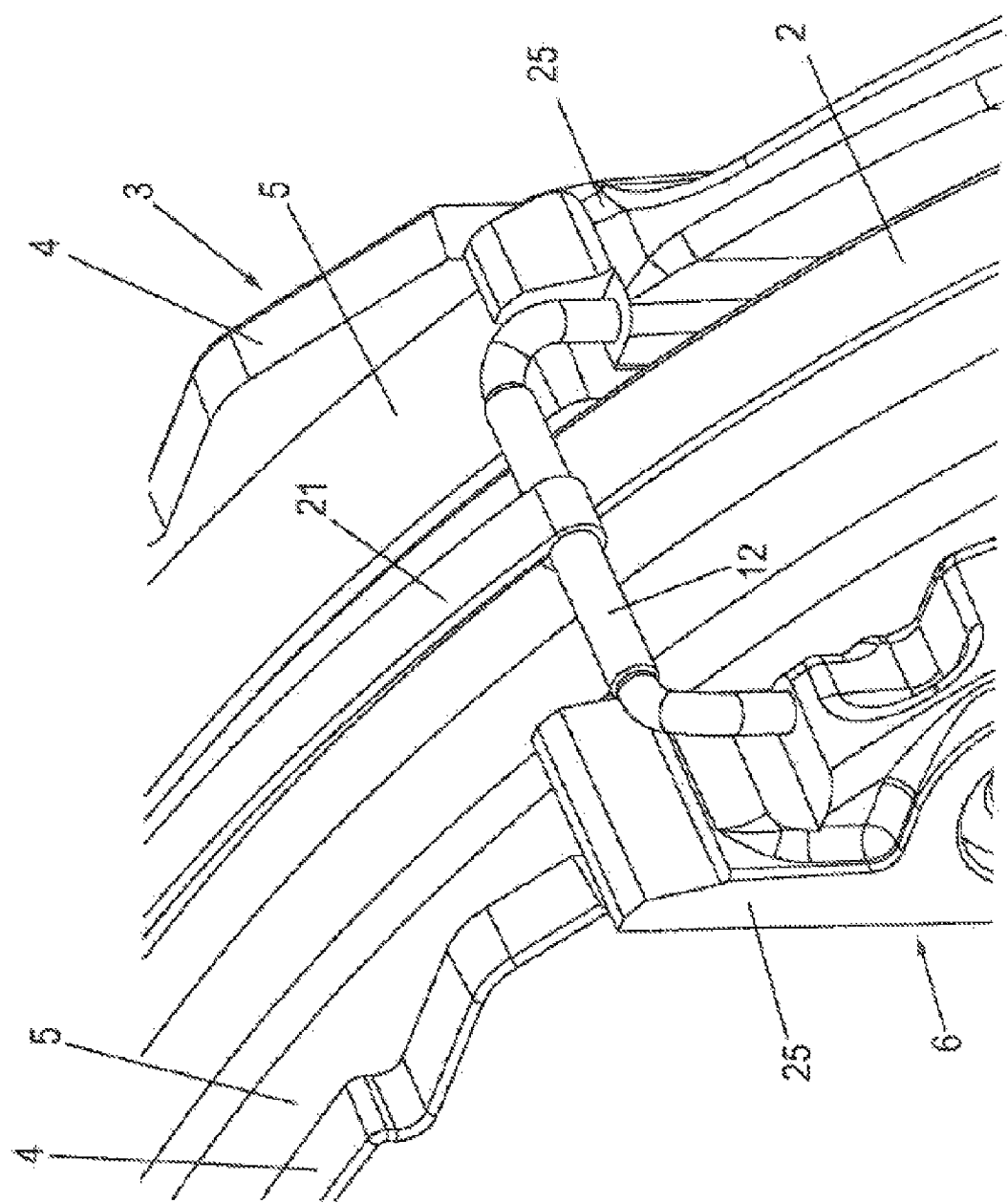
FIG. 20 shows an embodiment of a stirrup arrangement of a spreading device in accordance with the present invention.

A fastening of the stirrup 12 similar to FIG. 5 is illustrated in FIG. 20. Here, however, the securing devices 13 for the retention of the retaining bow 21 has been dispensed with. Instead, the retaining bow 21 is held in axially secured fashion on the stirrup 12 in particular by way of frictional engagement, though conceivably also by way of a positively locking action. Furthermore, the stirrup 12 is plugged into bores 25a of the mutually oppositely situated brake carrier horns 25.

Figure 21:
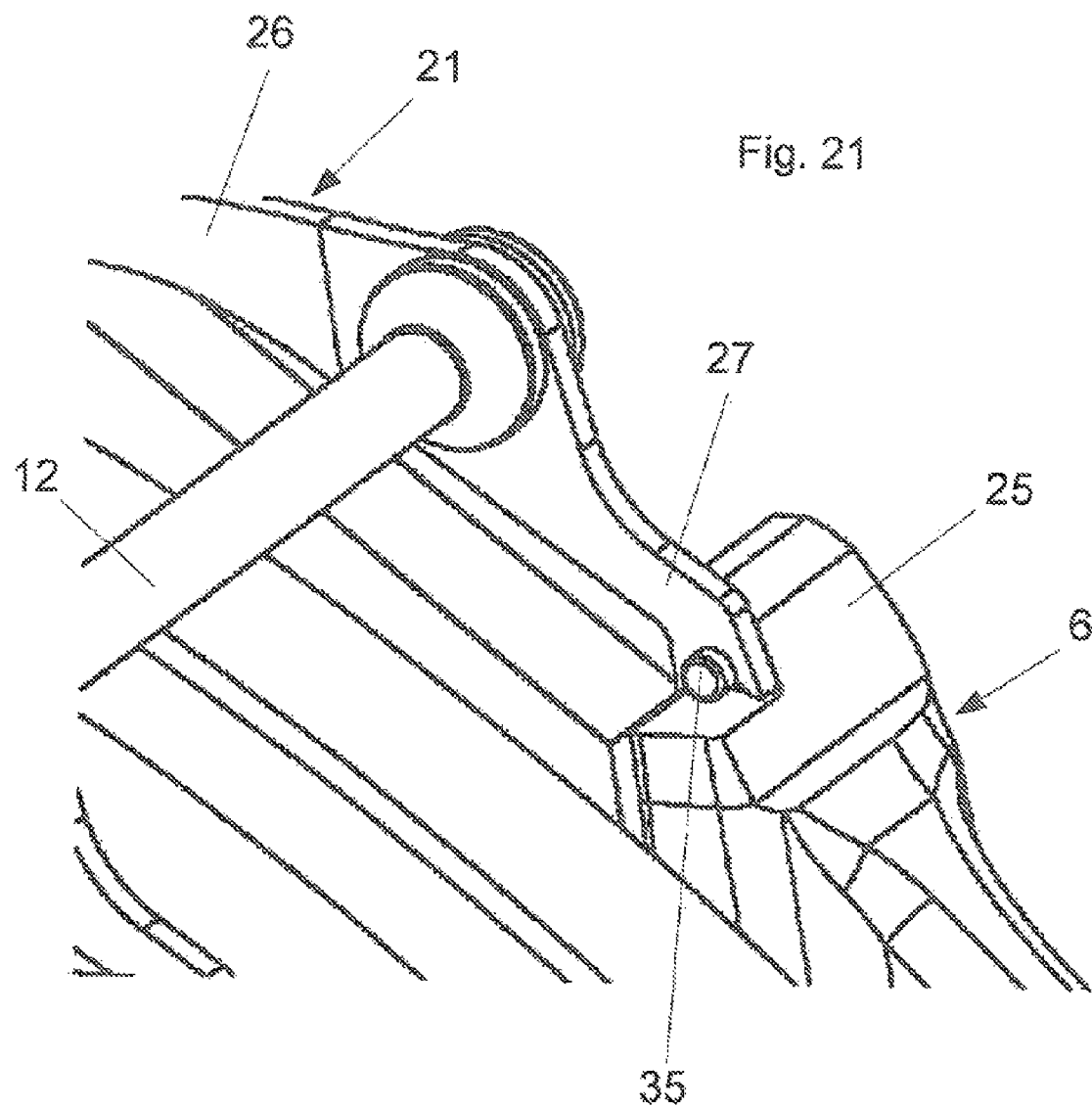
FIG. 21 shows another embodiment of a stirrup arrangement of a spreading device in accordance with the present invention.

A construction that differs from this can be seen in FIG. 21, which shows an enlarged detail of a fastening of the retaining bow 21.

Here, the stirrup 12 is in the form of a straightened bar and is fastened at the end to the retaining bow 21, the end limb 27 of which adjoins the center limb 26 in an aligned manner, wherein the end limb 27 has a fork-shaped end which engages over a pin 35 which is recessed into the brake carrier horn 25.

Figure 22:
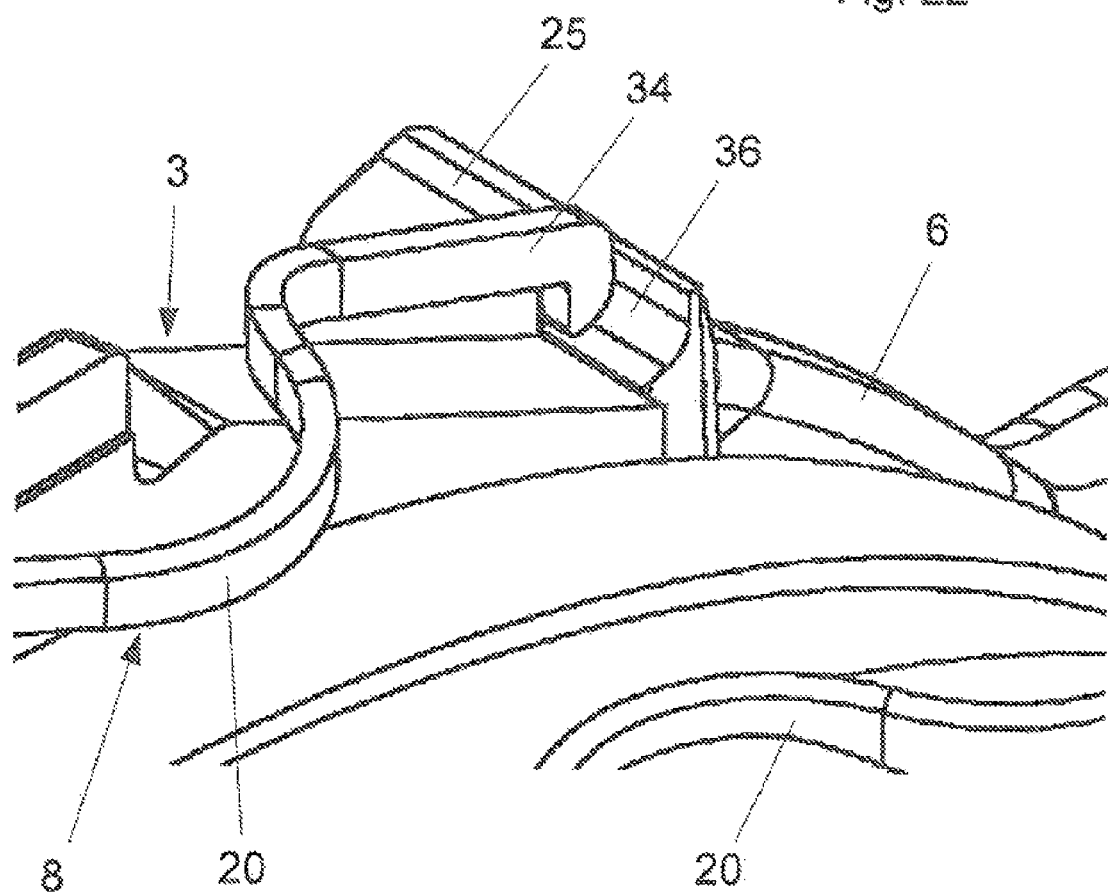
FIG. 22 shows another embodiment of an end of a spreading device in accordance with the present invention.

In FIG. 22, likewise an enlarged detail in the region of a brake carrier horn 25, it can be seen that a spring arm 20 of the spreading device 8 is adjoined by a support lug 34 which lies against a support surface 36 of the brake carrier horn 25 and is supported both in a radial direction with respect to the brake disc 2 and in an axial direction with respect thereto.

Figure 23:
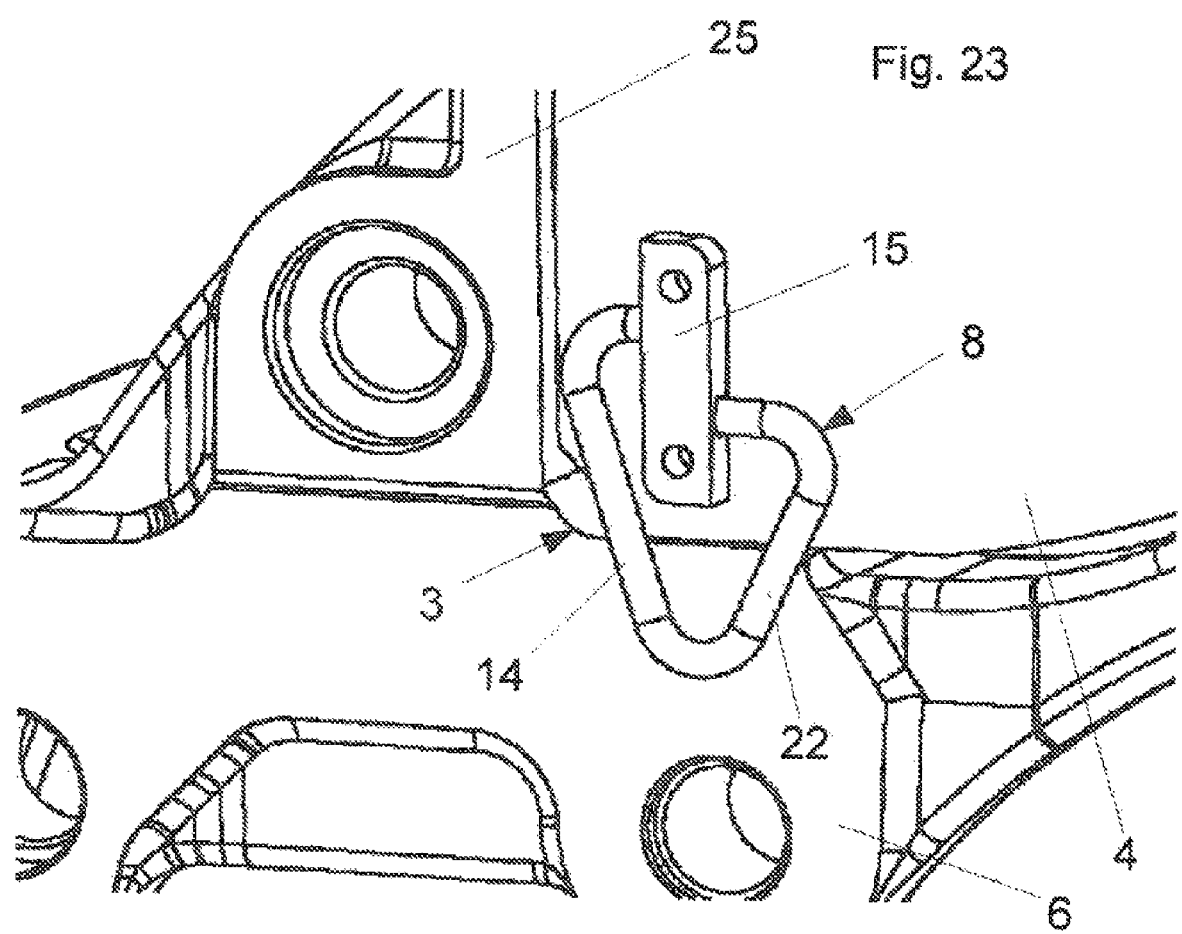
FIG. 23 shows another embodiment of a spreading device in accordance with the present invention.

Similarly to the embodiment as per FIG. 2, FIGS. 23 and 24 each illustrate a design variant of the spreading device 8 which is composed of a spring stirrup 14 and an abutment limb 22, which are both inserted, at the end by way of in each case one fastening end 14a, 22a, into the bracket 15, wherein the latter is fastened to the pad carrier plate 4.

Here, the spring stirrup 14 and the abutment limb 22 are fastened, offset with respect to one another and on opposite sides, to the bracket 15 and are supported at the other side on the brake carrier 6, specifically below the pad carrier plate 4 in the example shown in FIG. 23 and on the brake carrier horn 25 in the example shown in FIG. 24.

The bracket 15 is in the form of an elongate rectangular plate with two longitudinal sides 15a, 15b. Here, two diagonally opposite ends are rounded. The fastening end 14a of the spring stirrup 14 is connected to the bracket 15 eccentrically to the right at the top narrow longitudinal side 15a shown in FIG. 24, whereas the fastening end 22a of the abutment limb 22 is connected to the bracket 15 eccentrically to the left at the bottom, other narrow longitudinal side 15b.

The other ends of the spring stirrup 14 and of the abutment limb 22 run obliquely toward one another and are fixedly connected by a connecting bend 220.

The plate of the bracket 15 is in this case equipped with two fastening holes 15c for fastening purposes, for example by way of screws or rivets.

Figure 25:
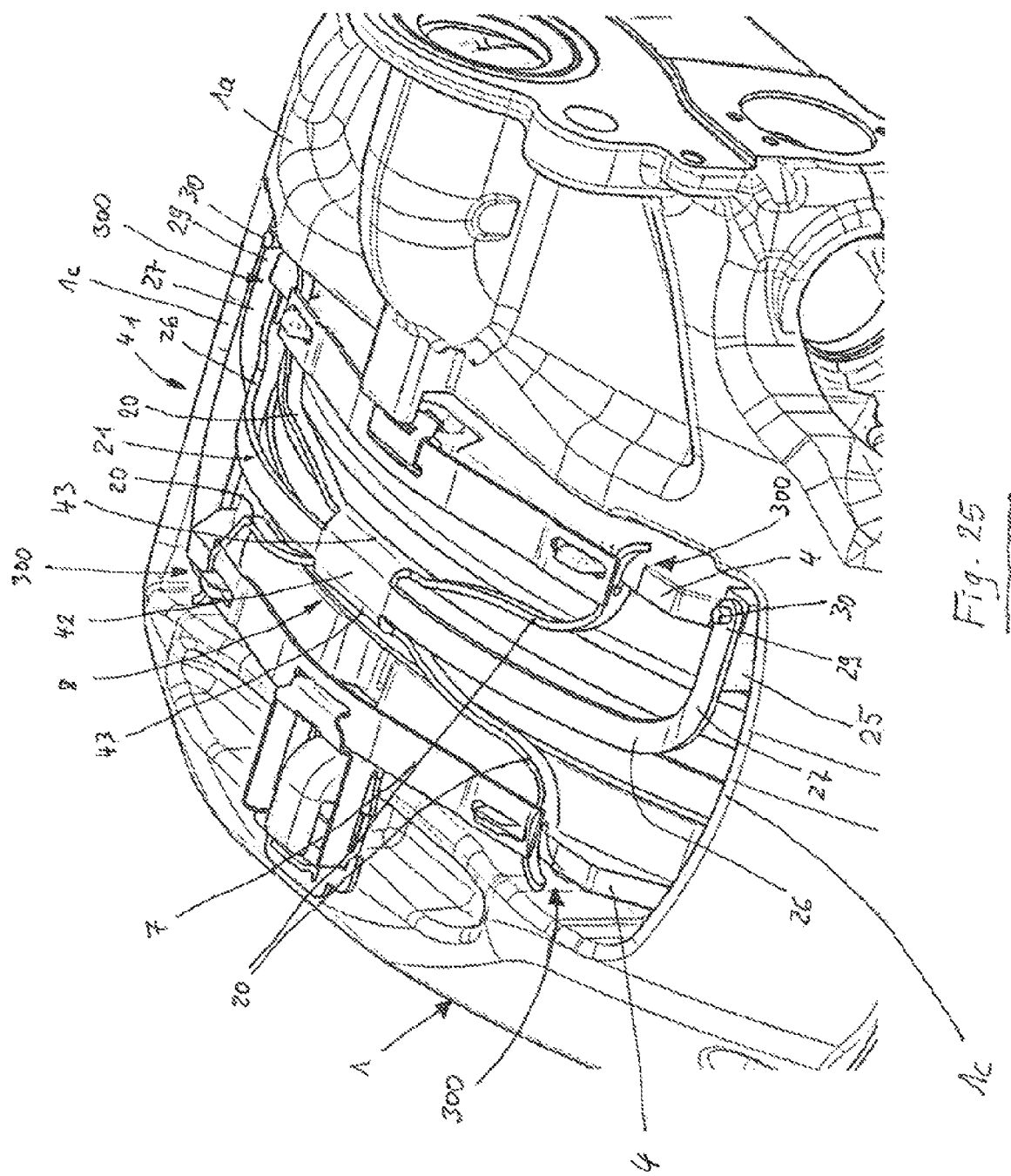
FIG. 25 shows another embodiment of a spreading device in accordance with of the present invention.

FIG. 25 shows a further embodiment which is of similar construction to that described in FIGS. 8 to 11, but with some differences.

The retaining bow 21 and the spring arms 20 are in this case formed in one piece, for example as a punched and bent part, and are fixedly connected in a central region by a common base section 42. The base section 42 lies in the virtual center of the opening 41 and in a plane which runs tangentially with respect to the brake disc 2.

From said base section 42, the center limbs 26 of the retaining bow 21 extend to both sides in a downwardly bent manner over the brake disc 2, as shown in the embodiment as per FIG. 4, as flat strip sections almost as far as the tension struts 1c which laterally delimit the opening 41. At these points, the two center limbs 26 are bent toward the application section 1a of the brake caliper 1 and transition in each case into an end limb 27.

Each end limb 27 has the lug 29 with the peg 30, similarly to the embodiment as per FIG. 8, but with the difference that the lug 29 is not of widened form. Each end limb 27 runs with its lug 29 in a plane such that the lug 29 lies on the associated brake carrier horn 25. Here, the peg 30 is received in a bore 25a (similarly to the situation shown in FIG. 26) and is fastened to the brake carrier horn 25. This self-evidently applies to both sides and to both brake carrier horns 25.

Furthermore, the base section 42 has, on its two longitudinal sides, in each case one connecting section 43 bent downward through approximately 90° toward the brake disc 2. Each connecting section 43 connects, on each longitudinal side of the base section 42, in each case two spring arms 20 to the base section 42 parallel to the imaginary longitudinal central line of the opening 41, such that an arrangement similar to that in FIG. 8 is obtained. Here, each connecting section 43 lies in a respective plane which is arranged at approximately 90° with respect to the plane of the base section 42 and which runs substantially parallel to the plane of the brake disc 2.

The spring ends 300 of the spring arms 20 are designed as illustrated and described in the embodiment as per FIG. 8 and in FIG. 11.

Figure 26:
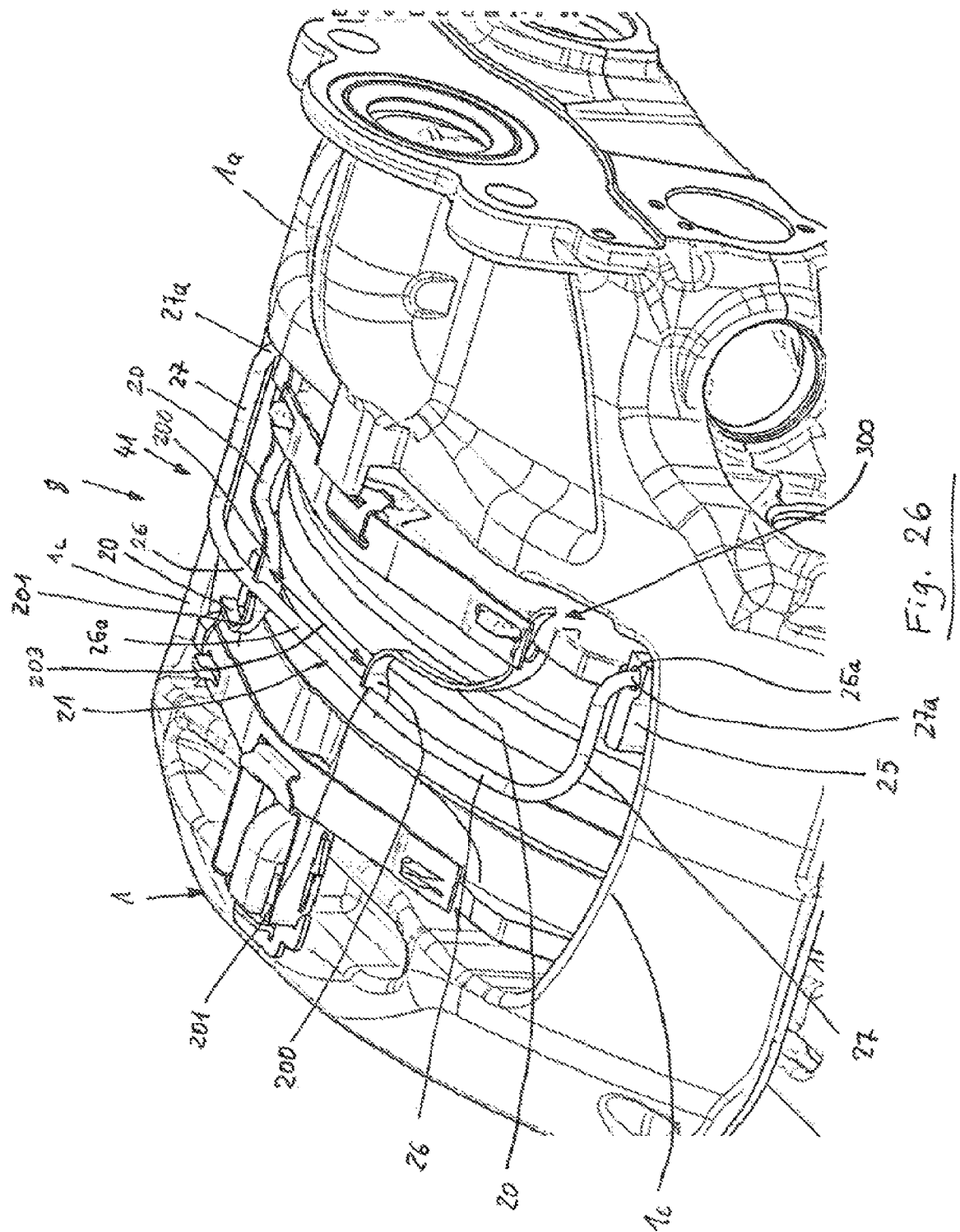
FIG. 26 shows another embodiment of a spreading device in accordance with the present invention.

FIG. 26 illustrates a further embodiment, in which the retaining bow 21 is of wire-like form and has, for example, a circular cross section.

The retaining bow 21 comprises a central section 26a in a central region of the opening 41. The central section 26a is adjoined, on each side, by a center section 26 which runs in each case in an arc in the direction of the application section 1a through an end limb 27 to the respective brake carrier horn 25. Each end limb 27 is then bent downward through approximately 90° into in each case one fastening section 27a. Each fastening section 27a is fastened in a bore 25a of each brake carrier horn 25 of the pad slot of the action-side brake pad 3 and thus realizes the retention of the retaining bow 21 with the spreading device 8 in the brake carrier 6.

Here, the spring arms 20 are connected in each case in pairwise fashion by a connecting section 200 not in the longitudinal direction of the opening 41 but in the transverse direction of the opening 41. Each connecting section 200 is widened in a downward radial direction toward the brake disc axis of rotation 2a and has a recess 201. Each recess 201 communicates with the outer contour of the retaining bow 21 and, here, has a semi-circular cross section which is upwardly open for the purposes of receiving the retaining bow 21. The connecting section 200 of the spring arms 20 thus arranged in pairwise fashion are arranged with a spacing 203 on the central section 26a of the retaining bow 21, wherein the center of the central section 26a is assigned to the virtual center of the opening 41 and forms the center of the spacing 203. A dimension of the spacing 203 corresponds in this case to approximately one quarter of the longitudinal extent of the opening 41. The dimension of the spacing 203 may for example lie in a range of 30 to 50% of the longitudinal extent of the opening 41 either symmetrically with respect to the virtual center of the opening 41 or without a relationship to the virtual center of the opening 41.

The spring arms 20 and the connecting sections 200 thereof are for example formed in one piece as punched and bent parts composed of spring steel strip.

Figure 27:
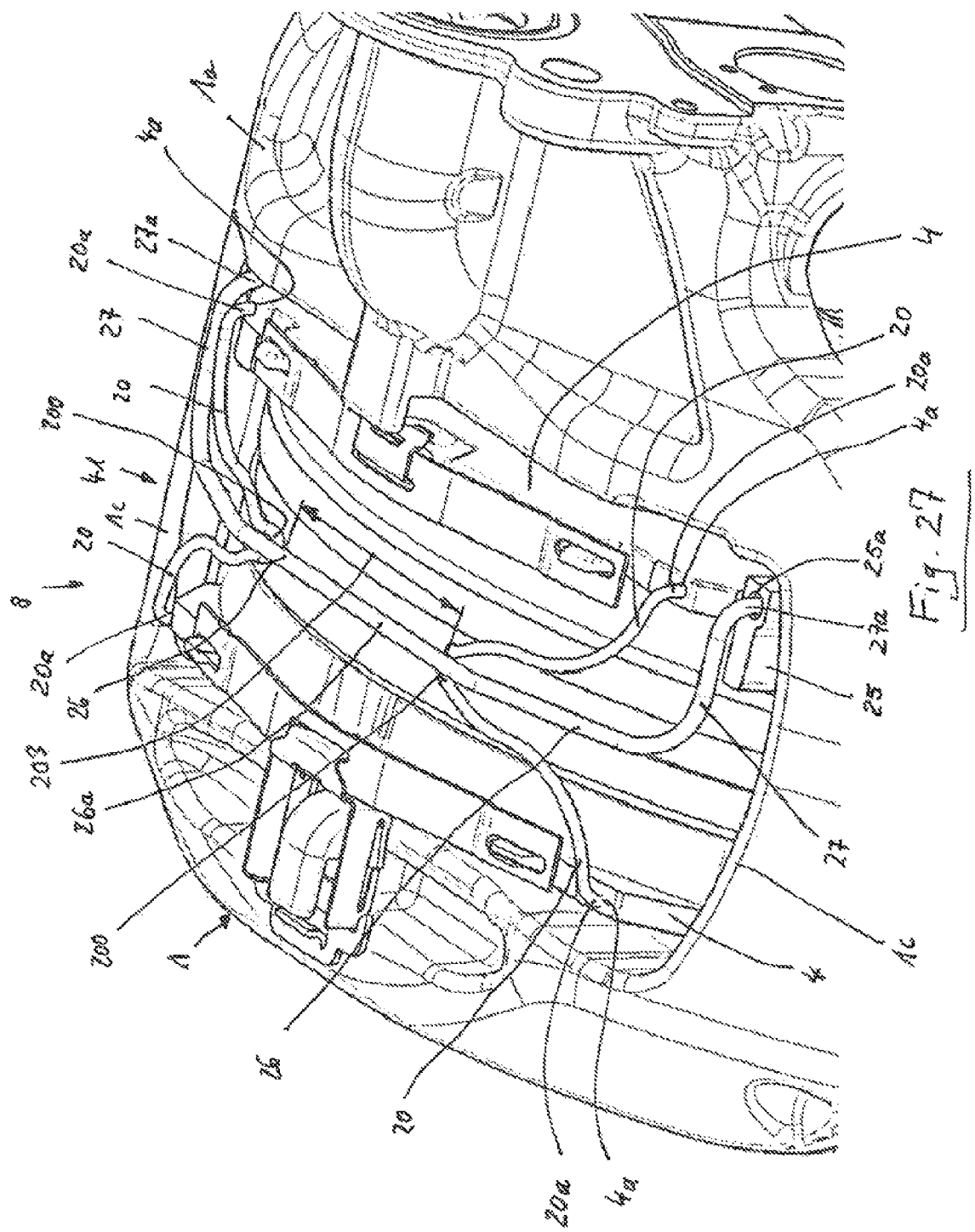
FIG. 27 shows another embodiment of a spreading device in accordance with the present invention.

In the embodiment of FIG. 27, the retaining bow 21 is designed as in the embodiment as per FIG. 26. Here, however, the spring arms 20 arranged in pairwise fashion in the transverse direction of the opening 41, including their connecting sections 200, are of wire-like form. The connecting sections 200 are bent so as to form receptacles for the retaining bow 21. The connecting sections 200 are, as in the exemplary embodiment as per FIG. 26, arranged with a spacing 203 on the central section 26a of the retaining bow 21.

The ends of the spring arms 20 are in each case in the form of a downwardly bent fastening section 20a. Each fastening section 20a is received, from the top side, in a receiving hole 4a on each end region of a pad carrier plate 4. In this way, the spreading device 8 transmits its spreading forces between each fastening section 20a in the associated receiving hole 4a to the respective pad carrier plates 4.

Figure 28:
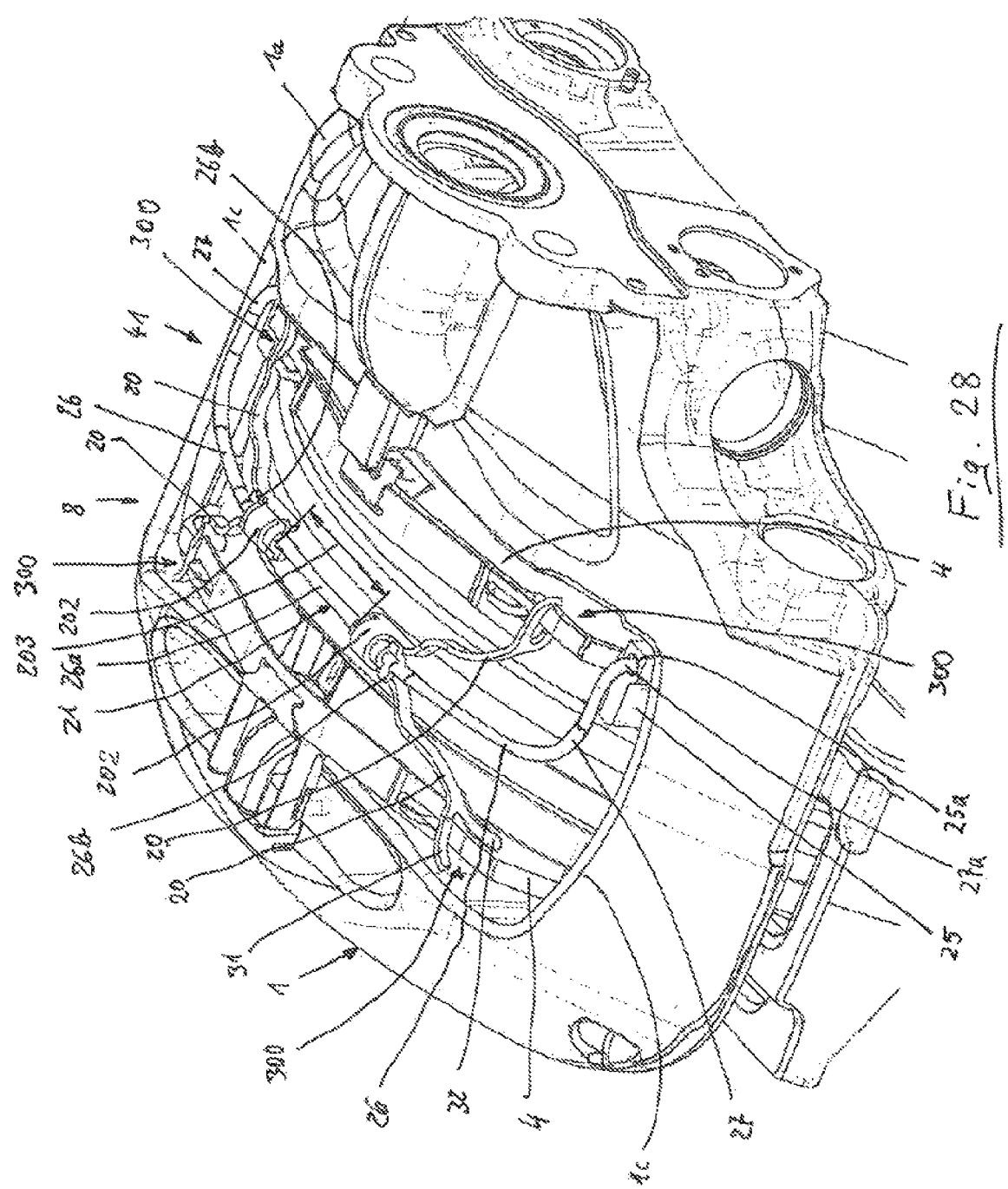
FIG. 28 shows another embodiment of a spreading device in accordance with the present invention.

FIG. 28 shows an embodiment in which the retaining bow 21 is, as in the embodiments as per FIGS. 26 and 27, of C-shaped form. The spring arms 20 have spring ends 300 as per FIG. 11. Furthermore, the spring arms 20 are arranged in pairwise fashion in the transverse direction of the opening 41. Each pair of spring arms 20 is connected, at the other ends thereof, by way of a respective hood-type connector 202.

Each hood-type connector 202 has a receiving opening, pointing downwardly toward the brake disc 2, in the longitudinal direction of the central section 26a of the retaining bow 21, which receiving opening communicates with the outer contour of the central section 26a of the retaining bow 21.

The spring arms 20, which are connected in pairwise fashion to in each case one hood-type connector 202, are, by way of their respective hood-type connector 202, placed onto the central section 26a of the retaining bow 21 from above such that the central section 26a is received in the receiving openings of the hood-type connectors 202. The hood-type connectors 202 are arranged with the spacing 203 to one another.

The central section 26a of the retaining bow 21 is furthermore equipped, at its ends at the respective transition to the respective center limb 26, with in each case one widened portion 26b. Each widened portion 26b forms an axial abutment for the associated hood-type connector 202 on the central section 26a in each case in the direction of the respectively adjacent tension strut 1c.

Figure 29:
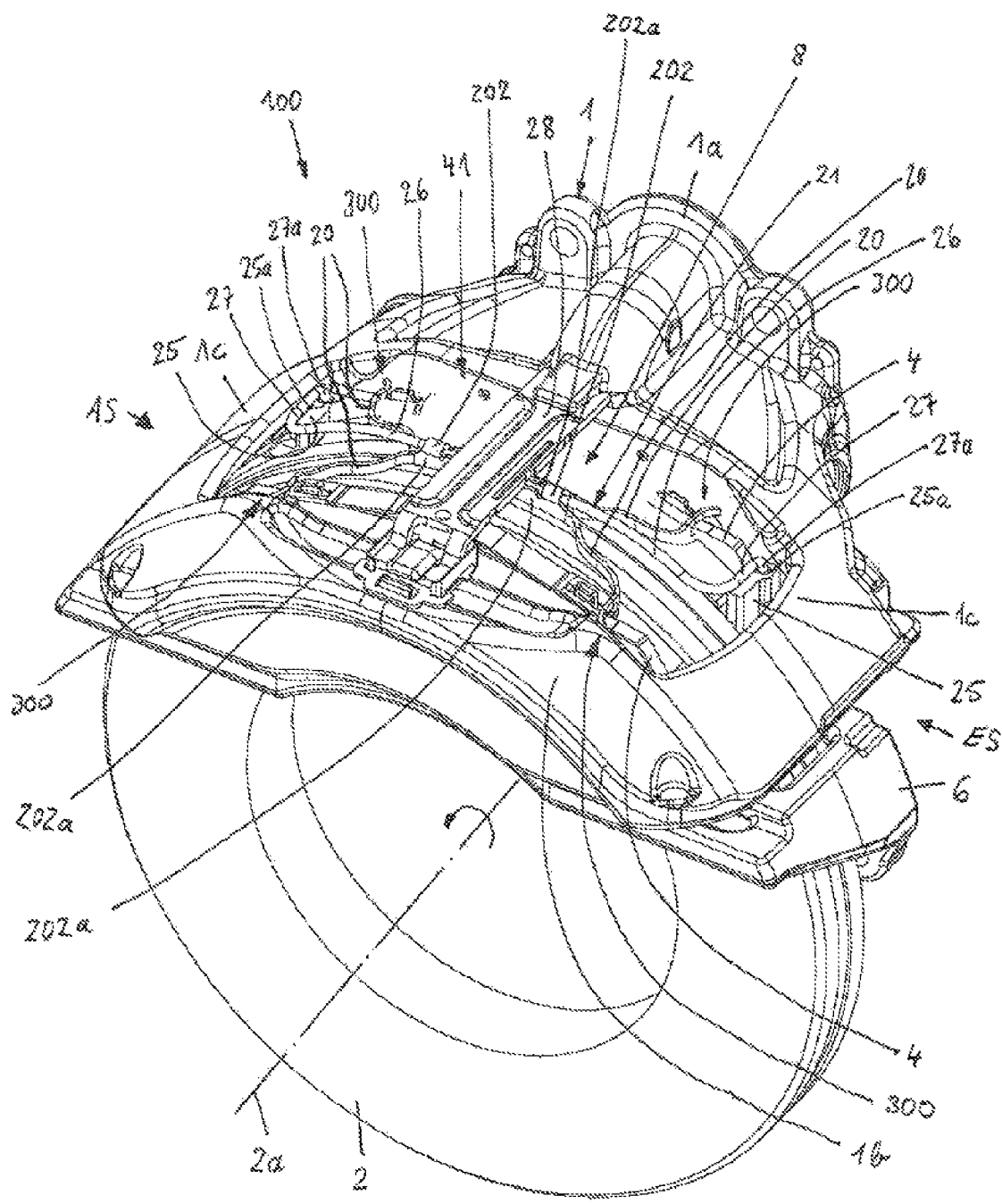
FIG. 29 shows a perspective view of a further embodiment of the disc brake.

FIG. 29 shows a disc brake 100 in a perspective illustration with the brake disc 2 and the brake disc axis of rotation 2a.

A rotation arrow about the brake disc axis of rotation 2a indicates a main direction of rotation for forward travel of a vehicle to which the disc brake 100 is assigned. A run-in side ES and, opposite, a run-out side AS, of the disc brake 100 are defined in relation to the main direction of rotation of the brake disc 2. Accordingly, the brake carrier horns 25 on the run-in side ES are referred to as run-in-side brake carrier horns 25, and those on the run-out side AS are referred to as run-out-side brake carrier horns 25.

In this embodiment, the spreading device 8 is constructed in substantially the same way as the spreading device 8 of the exemplary embodiment as per FIG. 28. A difference in relation to the embodiment as per FIG. 28 however consists in the fact that, in FIG. 29, the hood-type connectors 202 on both sides of the retaining bow 21 are connected by way of in each case one longitudinal connector 202a. Furthermore, here, the retaining bow 21 has no widened portions 26b.

In preferred embodiments, a length of the spring arms 20, taken together, in the longitudinal direction of the opening 41 corresponds to approximately 60 to 95% of a pad slot length, particularly preferably 70 to 80% of a pad slot length. The pad slot length is to be understood to mean the spacing of the associated brake carrier horns 25.

The spreading device 8 comprises two spreading elements, wherein, in a preferred embodiment, a first spreading element has two spring arms 20, which are connected in the longitudinal direction of the opening 41 and which act on the first brake pad 3. A second spreading element with two further spring arms 20, which are also connected in the longitudinal direction of the opening 41 and act on the second brake pad 3. The two spreading elements are connected to one another centrally (in relation to the brake carrier horns 25. It is thus possible for an identical spring force—in a small tolerance range—to be ensured both on the run-in side and on the run-out side. Different spring forces between run-out side AS and run-in side ES, which can lead to oblique wear, are minimized by way of the unilateral engagement of in each case one spring arm 20 per brake pad.

A uniform application of force by the spring arms 20 on the action side and on the reaction side, or on the side of the application section 1a (thrust-piece side) and on the side of the caliper rear section 1b (caliper side), can be realized by way of a flexible adjustment of the center web, that is to say of the retaining bow 21. Furthermore, it is possible for slight incorrect geometrical positioning of brake disc 2, friction pad 5 and pad carrier plate 4 to be compensated by way of the flexible center web.

By way of the center web, it is possible for the spreading device 8 as an active resetting device to be easily positioned and held down by the pad retaining stirrup 28. It is advantageously possible, during a brake pad change, for the spreading device 8 to be easily removed and also exchanged.

Through the utilization of the entire pad slot length between the brake carrier horns 25, it is possible for use to be made of spreading elements or spring arms 20 with a relatively low spring rate in order to impart substantially constant forces in the event of pad wear. Owing to the long spring travels, the spring elements 20 can be tolerant with regard to spring forces. The spring travels lead to a constant spring rate with low tolerances.

In a preferred design variant, only two springs are used.

The spreading elements, that is to say the spring arms 20, may be formed from inexpensive and geometrically flexible metal sheets.

As a result of the offset with different centers of rotation, it is possible to replicate a relatively low spring rate (see FIGS. 2, 23 and 24). It is advantageously the case that only a small number of windings is required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Brake caliper
1a Application section
1b Caliper rear section
1c Tension strut
2 Brake disc
2a Brake disc axis of rotation
3 Brake pad
4 Pad carrier plate
4a Receiving hole
5 Friction pad
6 Brake carrier
7 Pad retaining spring
7a Clip element
8 Spreading device
9 Flat spring
10 Slot
11 Lug
11a Thrust section
12 Stirrup
13 Securing means
14 Spring stirrup
14a Fastening end
15 Bracket
15a, 15b Longitudinal side
15c Fastening hole
16 Scissor element
17 Leaf spring
18 Spring limb
19 Abutment
20 Spring arm
20a Fastening section
21 Retaining bow
22 Abutment limb
22a Fastening end
23 Dome
24 Abutment stirrup
25 Brake carrier horn
25a Bore 26 Center limb
26a Central section
26b Widened portion
27 End limb
27a Fastening section
28 Pad retaining stirrup
29 Lug
30 Peg
31 Support limb
31a Bearing section
32 Pressure-exerting limb
32a Abutment section
32b Bearing section
33 Nut
34 Support lug
35 Pin
36 Support surface
37 Attachment web
38 Spring web
39 Angled lug
40 Retaining plate
41 Opening
42 Base section
43 Connecting section
44 Support section
45 Abutment surface
46 Bearing surface
100 Disc brake
150 Connection
151, 152 Mount
200 Connecting section
201 Recess
202 Hood-type connector
202a Longitudinal connector
203 Spacing
220 Connecting bend
300 Spring end
301 Slot
302 Movement direction
303 Abutment surface
304 Projection
305 Bearing surface
306 Angle

What is claimed is:

1. A disc brake for a utility vehicle, comprising:
a brake caliper configured to straddle a brake disc, the brake caliper being a sliding caliper and having a central opening over the brake disc;
a brake carrier configured to support the sliding brake caliper such that the sliding brake caliper is axially displaceable parallel to a rotation axis of the brake disc;
two brake pads arranged on opposite sides of the brake disc such that the brake pads are axially displaceable into contact with the brake disc, the brake pads each having a friction pad supported on a pad carrier plate;
a brake application device having at least one brake plunger configured to advance an application side one of the two brake pads into contact with the brake disc and cause the sliding brake caliper to axially slide to advance a reaction side one of the two brake pads into contact with the brake disc; and
at least one resetting device configured to retract the brake pads away from the brake disc after actuation of the brake application device to press the brake pads into contact with the brake disc, the at least one resetting device including a spreading device with resilient spreading elements configured to engage the respective pad carrier plates,
wherein
the spreading device is arranged in the central opening of the sliding brake caliper,
the spreading elements engage outside the friction pads, directly or indirectly on a center region of the brake pad backing plates or at at least two abutment regions arranged spaced apart from one another relative to the center the brake pad backing plates,
the abutment regions have in each case an abutment surface and one bearing surface on which the spreading elements are movably arranged,
the spreading elements extend starting from a central region of the sliding brake caliper opening from a center of the opening to the spaced-apart abutment regions of the brake pads,
the spreading elements extend from the central region to the spaced-apart abutment regions uniformly relative to the central region,
the spreading device has spring arms arranged to contact respective pad carrier plate,
the spring arms are connected to one another at opposing ends of the central region,
the central region of the central opening of the sliding brake caliper extends in a direction perpendicular to the brake disc rotation axis to both sides of a center of the opening of the sliding brake caliper over a length between 30% to 50% of a longitudinal axis of the opening of the sliding brake caliper perpendicular to the brake disc rotation axis,
the central region includes a retaining bow is attached to the brake carrier to which the spring arms are connected,
the retaining bow is connected to two brake carrier horns which delimit pad slots configured to receive the two brake pads, and
the retaining bow is C-shaped with two mutually opposed end limbs and a center limb.

2. A brake pad set for a disc brake according to claim 1, comprising:
at least two brake pads, each brake pad having a pad carrier plate supporting a friction pad, and
a spreading device with resilient spreading elements configured to engage the respective pad carrier plates,
wherein
each of the pad carrier plates have in each case at least one an abutment surface and at least one bearing surface on brake pad backing plates outside the friction pads, the surfaces being on a center region of the brake pad backing plates or at at least two abutment regions arranged spaced apart from one another relative to the center the brake pad backing plates,
the spreading device includes spreading elements extending starting from a central region to the spaced-apart abutment regions of the brake pads,
the spreading elements extend from the central region to the spaced-apart abutment regions uniformly relative to the central region,
the spreading device has spring arms arranged to contact respective ones of the pad carrier plates,
the spring arms are connected to one another at opposing ends of the central region, the central region includes a retaining bow is attached to the brake carrier to which the spring arms are connected, and the retaining bow is C-shaped with two mutually opposed end limbs and a center limb.

3. The brake pad set according to claim 2, wherein the bearing surfaces of the abutment regions are arranged at an angle with respect to a horizontal line between lateral sides of the brake pads between 3° to 15°.

4. The brake pad set according to claim 3, wherein the abutment surface protrudes from the pad carrier plate or is formed into the pad carrier plate.

5. The brake pad set according to claim 4, wherein a projection protrudes from the abutment surface.

6. The brake pad set according to claim 2, wherein the abutment regions each have a support section with the abutment surface and the bearing surface formed into the pad carrier plate.

7. The brake pad set according to claim 6, wherein the abutment surface is offset, in a direction pointing away from the friction pad, relative to a pad carrier plate side surface having the friction pad.

8. The disc brake according to claim 1, wherein the spring arms are supported in a radial direction on the brake carrier.

9. The disc brake according to one of claim 8, wherein each spring arm includes a fork-shaped spring end with a support limb and a pressure-exerting limb, the support limb is in movable contact with a bearing surface of a radially outer side of the pad carrier plate, and the pressure-exerting limb is in movable contact with pressure against an abutment surface of a side of the pad carrier plate supporting the friction pad.

10. The disc brake according to claim 9, wherein the bearing surface is arranged at an angle with respect to a horizontal line between opposing lateral sides of the brake pad between 3° to 15°.

11. The disc brake according to claim 9, wherein the abutment surface protrudes axially from the pad carrier plate or is formed into the pad carrier plate.

12. The disc brake according to claim 9, wherein a projection protrudes from the abutment surface into a slot between the support limb and the pressure-exerting limb.

13. The disc brake according to claim 1, wherein each spring arm includes a fork-shaped spring end with a support limb and a pressure-exerting limb, the pressure-exerting limb is in contact with a support section of a side of the pad carrier plate supporting the friction pad, and the pressure-exerting limb has an abutment section in movable contact with pressure against an abutment surface of the support section of the pad carrier plate, and has a bearing section in movable contact with a bearing surface of the support section of the pad carrier plate.

14. The disc brake according to claim 13, wherein the abutment surface of the support section and the bearing surface are formed on the pad carrier plate.

15. The disc brake according to claim 14, wherein the spring arms on sides facing toward the respective abutment surfaces are convex in the respective abutment regions of the pad carrier plates.

16. The disc brake according to claim 15, wherein at least the respective spring arms associated with a respective one of the one of the two brake pads have an end spring web configured to contact the pad carrier plate and an attachment web connected to the brake carrier.

17. The disc brake according to claim 1, wherein the resilient spreading elements include two flat springs, each flat spring being associated with a respective one of the two brake pads, the two flat springs are located at respective ends on stirrups connected to the brake carrier, and in the center region, the two flat springs engage in positively locking fashion into a pad retaining spring of the respective brake pad.

18. The disc brake according to claim 17, wherein the two flat springs each include an abutment stirrup configured to contact an abutment of the pad carrier plate.

19. The disc brake according to claim 17, wherein the two flat springs are axially secured on the stirrups.

20. The disc brake according to claim 1, wherein the spreading device has two leaf springs fastened at respective first ends to a stirrup and at respective second ends to scissor elements which are attached to the pad carrier plates.

21. The disc brake according to claim 20, wherein the leaf springs are deformed radially outward during the application of the brake.

22. The disc brake according to claim 1, wherein each spreading device includes a spring stirrup rotationally attached to a rear side of the respective pad backing plate opposite a side supporting the friction pad and an abutment limb, and the spring stirrup and abutment limb are supported on the brake carrier.

23. The disc brake according to claim 22, wherein the spring stirrup and the abutment limb are retained in a bracket of the pad carrier plate, and fastening ends of the spring stirrup and of the abutment limb are arranged offset with respect to one another in a longitudinal direction of the respective pad carrier plates.

24. The disc brake according to claim 1, wherein the end limbs have in each case a lug into which corresponding pegs on the brake carrier horns are inserted.

25. The disc brake according to claim 1, wherein the retaining bow is supported in a radial direction on the brake carrier.

26. The disc brake according to claim 1, wherein the spreading device has spring limbs which cross one another in the central region and are rotationally fixedly to a retaining bow, and free ends of the spring limbs centrally contact the pad carrier plate.

27. The disc brake according to claim 1, wherein at least one loop-shaped resilient abutment limb is fixedly connected to a stirrup and contacts mutually-opposed faces of the pad carrier plates.

28. A disc brake for a utility vehicle, comprising:
a brake caliper configured to straddle a brake disc, the brake caliper being a sliding caliper and having a central opening over the brake disc;

a brake carrier configured to support the sliding brake caliper such that the sliding brake caliper is axially displaceable parallel to a rotation axis of the brake disc;

two brake pads arranged on opposite sides of the brake disc such that the brake pads are axially displaceable into contact with the brake disc, the brake pads each having a friction pad supported on a pad carrier plate;

a brake application device having at least one brake plunger configured to advance an application side one of the two brake pads into contact with the brake disc and cause the sliding brake caliper to axially slide to advance a reaction side one of the two brake pads into contact with the brake disc; and at least one resetting device configured to retract the brake pads away from the brake disc after actuation of the brake application device to press the brake pads into contact with the brake disc, the at least one resetting device including a spreading device with resilient spreading elements configured to engage the respective pad carrier plates, wherein the spreading device is arranged in the central opening of the sliding brake caliper, the spreading elements engage outside the friction pads, directly or indirectly on a center region of the brake pad backing plates or at at least two abutment regions arranged spaced apart from one another relative to the center the brake pad backing plates, the abutment regions have in each case an abutment surface and one bearing surface on which the spreading elements are movably arranged, the spreading elements extend starting from a central region of the sliding brake caliper opening from a center of the opening to the spaced-apart abutment regions of the brake pads, the spreading elements extend from the central region to the spaced-apart abutment regions uniformly relative to the central region, the spreading device has spring arms arranged to contact respective pad carrier plate, the spring arms are connected to one another at opposing ends of the central region, the central region of the central opening of the sliding brake caliper extends in a direction perpendicular to the brake disc rotation axis to both sides of a center of the opening of the sliding brake caliper over a length between 30% to 50% of a longitudinal axis of the opening of the sliding brake caliper perpendicular to the brake disc rotation axis, the central region includes a retaining bow is attached to the brake carrier to which the spring arms are connected, the retaining bow is attached to two mutually oppositely situated stirrups which are connected to the brake carrier, and the retaining bow is C-shaped with two mutually opposed end limbs and a center limb.

* * * * *